(12) United States Patent
Jiang et al.

(10) Patent No.: US 10,985,888 B2
(45) Date of Patent: Apr. 20, 2021

(54) METHOD AND DEVICE IN UE AND BASE STATION FOR WIRELESS COMMUNICATION

(71) Applicants: Qi Jiang, Shanghai (CN); XiaoBo Zhang, Shanghai (CN); Lin Yang, Shanghai (CN)

(72) Inventors: Qi Jiang, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 22 days.

(21) Appl. No.: 16/596,785

(22) Filed: Oct. 9, 2019

(65) Prior Publication Data
US 2020/0119884 A1 Apr. 16, 2020

(51) Int. Cl.
*H04W 4/00* (2018.01)
*H04L 5/00* (2006.01)
*H04W 72/04* (2009.01)

(52) U.S. Cl.
CPC .......... *H04L 5/0053* (2013.01); *H04L 5/0044* (2013.01); *H04W 72/0446* (2013.01); *H04W 72/0453* (2013.01)

(58) Field of Classification Search
CPC ... H04L 5/0053; H04L 5/0044; H04L 5/0098; H04L 27/0006; H04W 72/0453; H04W 72/0446; H04W 16/14; H04W 72/042
USPC ........................................ 370/330
See application file for complete search history.

(56) References Cited

U.S. PATENT DOCUMENTS 6,864,838 B2 * 3/2005 Harles .................. G01S 13/325
                                                            342/375
2020/0169440 A1 * 5/2020 Thomas ............ H04W 72/0406

* cited by examiner

*Primary Examiner* — Amancio Gonzalez

(57) ABSTRACT

The disclosure provides a method and a device in a User Equipment (UE) and a base station for wireless communication. The UE first receives a first signaling, the first signaling being used for determining a number of bits included in a first bit block; then the UE performs first listening to determine that a first frequency-domain resource set is available for wireless transmission; and finally the UE transmits a first radio signal in a first time-domain resource set of the first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set. The disclosure improves opportunities of transmission on unlicensed spectrum.

20 Claims, 13 Drawing Sheets

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201811189882.5, filed on Oct. 12, 2018, the full disclosure of which is incorporated herein by reference.

BACKGROUND

Technical Field

The disclosure relates to methods and devices in wireless communication systems, and in particular to a method and a device in a wireless communication system supporting data transmission on unlicensed spectrum.

Related Art

In conventional 3rd Generation Partner Project (3GPP) Long Term Evolution (LTE) systems, data transmission can occur on licensed spectrum only. However, with the increasing diversification of application scenarios and the sharp increase of services, the conventional licensed spectrum probably is difficult to meet the requirements of the services. In LTE Release 13 and Release 14, communication on unlicensed spectrum is introduced to cellular systems and it is applied to transmissions of uplink data and downlink data.

In LTE Licensed Assisted Access (LAA) items, a transmitter (base station or User Equipment (UE)) needs to perform Listen Before Talk (LBT) before transmitting data on the unlicensed spectrum, so as to avoid causing interferences to other wireless transmissions that are ongoing on the unlicensed spectrum. In order to avoid reduction of resource utilization and latency due to frequent LBT, Autonomous Uplink (AUL) access is introduced to the unlicensed spectrum in Release 15. In the AUL, a UE can conduct uplink transmission autonomously in air interface resources preconfigured by the base station. A Channel Occupancy Time (COT) acquired by the UE may be shared by the base station to increase the probability of channel occupancy. At present, subband-based LTB is widely discussed in 3GPP, and the method for subband LBT needs to be further studied.

SUMMARY

Compared with the uplink transmission mode of AUL, the uplink transmission on unlicensed spectrum based on the dynamic scheduling of a base station still has advantages of high spectrum efficiency and easy reception at the base station side. However, the base station does not know the occupancy of channels before transmitting a UL grant; the uplink transmission on unlicensed spectrum in Release 13 and Release 14 can only occur on definite time-frequency resources scheduled by the base station; if the time-frequency resources scheduled by the base station are not idle, the uplink transmission will fail. When the above method is applied to LAA scenarios in Release 15, particularly when the unlicensed spectrum exists in the form of multiple subbands and the UE finds after LBT that partial subbands among the multiple subbands are idle, giving up transmission will lead to waste of resources in the subbands on which the LBT is passed and significantly reduce the transmission opportunities of the UE.

In view of the above problems, the disclosure provides a solution. It should be noted that the embodiments of the UE of the disclosure and the characteristics in the embodiments may be applied to the base station, and vice versa. The embodiments of the disclosure and the characteristics in the embodiments may be mutually combined if no conflict is incurred.

The disclosure provides a method in a UE for wireless communication, wherein the method includes:
 receiving a first signaling, the first signaling being used for determining a number of bits included in a first bit block;
 performing first listening to determine that a first frequency-domain resource set is available for wireless transmission; and
 transmitting a first radio signal in a first time-domain resource set of the first frequency-domain resource set.

Herein, a second bit block is used for generating the first radio signal, and the second bit block is obtained after the first bit block is processed through channel coding; and the first time-domain resource set is related to a number of bits not transmitted in a current second bit block and the first frequency-domain resource set.

In one embodiment, the above method has the following benefits: the first signaling is used for determining a size of the first bit block, thereby determining a size of the second bit block; when the second bit block is split into multiple bit subblocks to transmit, the multiple bit subblocks can determine occupied frequency-domain resources flexibly according to a result of the first listening, that is, the first frequency-domain resource set, thereby guaranteeing that, when the UE performs LBT on multiple subbands, the subbands on which LBT is passed can all be used for transmission of the first radio signal, thus improving spectrum efficiency and transmission opportunities.

In one embodiment, the above method has another following benefit: a relationship is established between the length of time-domain resources (that is, the first time-domain resource set) occupied by the first radio signal and the number of bits not transmitted and the number of subbands (which is related to the band width of the first time-domain resource set) on which LBT is passed; when the band resource on which LBT is passed becomes narrow, the UE prolongs the occupied time-domain resources to transmit as much data as possible to a base station, thereby improving efficiency and performance of transmission.

According to one aspect of the disclosure, the above method includes:
 performing second listening to determine that a second frequency-domain resource set is available for wireless transmission; and
 transmitting a second radio signal in a second time-domain resource set of the second frequency-domain resource set.

Herein, the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

In one embodiment, the above method has the following benefits: the first radio signal and the second radio signal are used together for the transmission of the second bit block, which realizes the transmission of a Transport Block (TB) across multiple Max Channel Occupy Times (MCOTs), thereby further improving the flexibility of transmission and reducing the payload of scheduling signalings.

According to one aspect of the disclosure, the above method includes:

terminating transmission of any bit in the second bit block that has not been transmitted yet by an end time of a first time window.

Herein, the first signaling indicates the first time window, and the first time window includes the first time-domain resource set.

In one embodiment, the above method has the following benefits: a base station determines a duration of the maximum time-domain resources that the second bit block can occupy, that is, the first time window; when the accumulated time-domain resources occupied by the second bit block reach the first time window, the base station stops receiving the bit(s) in the second bit block that has(have) not been transmitted, and the UE stops transmitting the bit(s) in the second bit block that has(have) not been transmitted; the above method simplifies the operations at the base station side and avoids one TB occupying too long transmission time.

According to one aspect of the disclosure, the above method is characterized in that: the operation of terminating transmission of any bit in the second bit block that has not been transmitted yet by an end time of a first time window includes:

receiving a second signaling, the second signaling being used for indicating whether the first bit block is correctly received.

Herein, the second signaling is transmitted behind the first time window, and the UE does not transmit any bit in the second bit block between the end time of the first time window and a transmit start time of the second signaling.

In one embodiment, the above method has the following benefits: when the coding scheme from the first bit block to the second bit block introduces a repetition coding scheme, the base station can decode all bits in the first bit block without receiving the whole second bit block, thus the second signaling achieves the function of notifying the UE to terminate the transmission of the first bit block.

According to one aspect of the disclosure, the above method includes:

transmitting a third radio signal.

Herein, the third radio signal indicates at least one of the first frequency-domain resource set and the first time-domain resource set.

In one embodiment, the above method has the following benefits: the first frequency-domain resource set is related to the LBT result of the UE and the number of bits not transmitted in the second bit block; the base station does not know the position of time-frequency resources actually occupied by the first radio signal; the above third radio signal directly indicates the position of time-frequency resources occupied by the first radio signal, thus simplifying the operations at the base station side and improving the decoding speed at the base station side.

The disclosure provides a method in a base station for wireless communication, wherein the method includes:

transmitting a first signaling, the first signaling being used for determining a number of bits included in a first bit block; and receiving a first radio signal in a first time-domain resource set of a first frequency-domain resource set.

Herein, a second bit block is used for generating the first radio signal, and the second bit block is obtained after the first bit block is processed through channel coding; and the first time-domain resource set is related to a number of bits not transmitted in a current second bit block and the first frequency-domain resource set.

According to one aspect of the disclosure, the above method includes:

receiving a second radio signal in a second time-domain resource set of a second frequency-domain resource set.

Herein, the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

According to one aspect of the disclosure, the above method includes:

terminating reception of any bit in the second bit block that has not been transmitted yet by an end time of a first time window.

Herein, the first signaling indicates the first time window, and the first time window includes the first time-domain resource set.

According to one aspect of the disclosure, the above method is characterized in that: the operation of terminating reception of any bit in the second bit block that has not been transmitted yet by an end time of a first time window includes:

transmitting a second signaling, the second signaling being used for indicating whether the first bit block is correctly received.

Herein, the second signaling is transmitted behind the first time window, and the base station does not receive any bit in the second bit block between the end time of the first time window and a time to start transmitting the second signaling.

According to one aspect of the disclosure, the above method includes:

receiving a third radio signal.

Herein, the third radio signal indicates at least one of the first frequency-domain resource set and the first time-domain resource set.

The disclosure provides a UE for wireless communication, wherein the UE includes:

a first receiver, to receive a first signaling, the first signaling being used for determining a number of bits included in a first bit block;

a second receiver, to perform first listening to determine that a first frequency-domain resource set is available for wireless transmission; and a first transmitter, to transmit a first radio signal in a first time-domain resource set of the first frequency-domain resource set.

Herein, a second bit block is used for generating the first radio signal, and the second bit block is obtained after the first bit block is processed through channel coding; and the first time-domain resource set is related to a number of bits not transmitted in a current second bit block and the first frequency-domain resource set.

The disclosure provides a base station for wireless communication, wherein the base station includes:

a second transmitter, to transmit a first signaling, the first signaling being used for determining a number of bits included in a first bit block; and a third receiver, to receive a first radio signal in a first time-domain resource set of a first frequency-domain resource set.

Herein, a second bit block is used for generating the first radio signal, and the second bit block is obtained after the first bit block is processed through channel coding; and the first time-domain resource set is related to a number of bits not transmitted in a current second bit block and the first frequency-domain resource set.

In one embodiment, compared with conventional schemes, the disclosure has the following advantages.

The first signaling is used for determining a size of the first bit block, thereby determining a size of the second bit block; when the second bit block is split into multiple bit subblocks to transmit, the multiple bit subblocks can determine occupied frequency-domain resources flexibly according to a result of the first listening, that is, the first frequency-domain resource set, thereby guaranteeing that, when the UE performs LBT on multiple subbands, the subbands on which LBT is passed can all be used for transmission of the first radio signal, thus improving spectrum efficiency and transmission opportunities.

A relationship is established between the length of time-domain resources occupied by the first radio signal and the number of bits not transmitted and the number of subbands on which LBT is passed; when the band resource on which LBT is passed becomes narrow, the UE prolongs the occupied time-domain resources to transmit as much data as possible to a base station, thereby improving efficiency and performance of transmission.

The first radio signal and the second radio signal are used together for the transmission of the second bit block, which realizes the transmission of a TB across multiple MCOTs, thereby further improving the flexibility of transmission and reducing the payload of scheduling signalings; a base station determines a duration of the maximum time-domain resources that the second bit block can occupy, that is, the first time window; when the accumulated time-domain resources occupied by the second bit block reach the first time window, the base station stops receiving the bit(s) in the second bit block that has(have) not been transmitted, and the UE stops transmitting the bit(s) in the second bit block that has(have) not been transmitted; the above method simplifies the operations at the base station side and avoids one TB occupying too long transmission time.

When the coding scheme from the first bit block to the second bit block introduces a repetition coding scheme, the base station can decode all bits in the first bit block without receiving the whole second bit block, thus the second signaling achieves the function of notifying the UE to terminate the transmission of the first bit block.

The first frequency-domain resource set is related to the LBT result of the UE and the number of bits not transmitted in the second bit block; the base station does not know the position of time-frequency resources actually occupied by the first radio signal; the above third radio signal directly indicates the position of time-frequency resources occupied by the first radio signal, thus simplifying the operations at the base station side and improving the decoding speed at the base station side.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
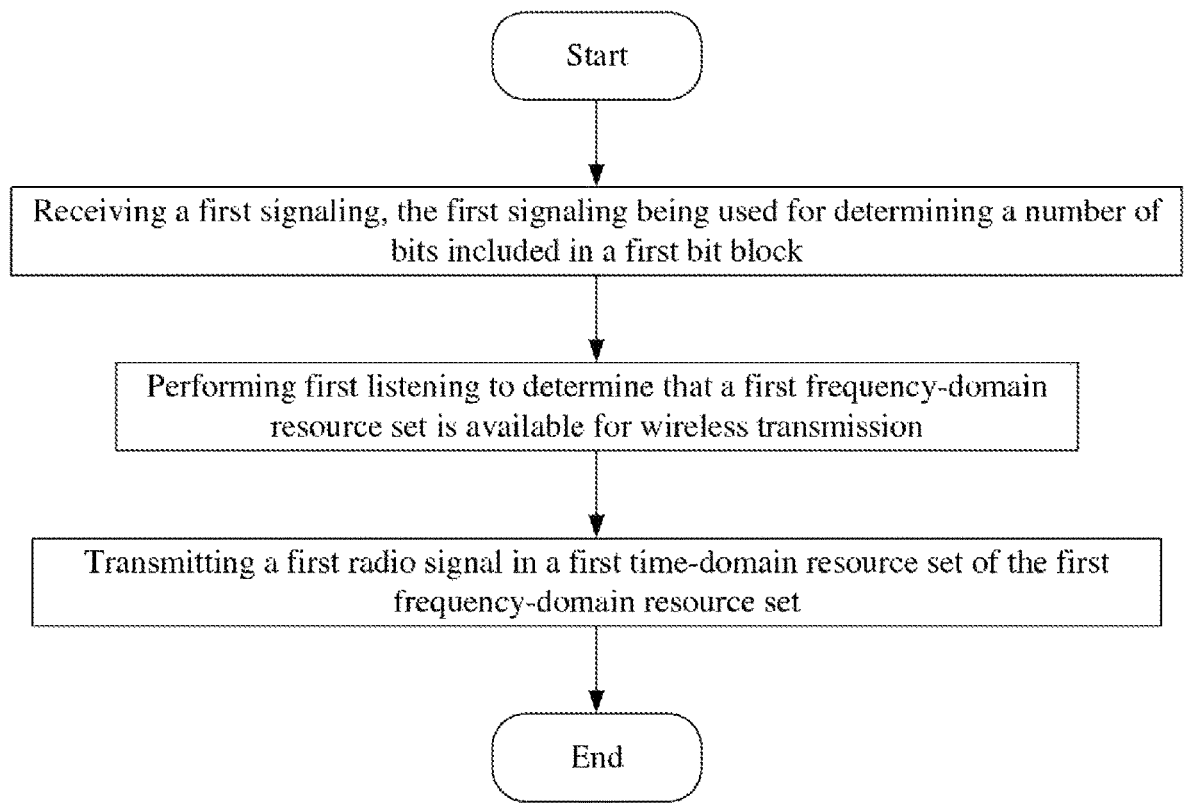
FIG. 1 is a flowchart of a first signaling according to one embodiment of the disclosure.

Embodiment 1 illustrates an example of a flowchart of a first signaling, as shown in FIG. 1.

In Embodiment 1, the UE in the disclosure first receives a first signaling, the first signaling being used for determining a number of bits included in a first bit block; then the UE performs first listening to determine that a first frequency-domain resource set is available for wireless transmission; and finally the UE transmits a first radio signal in a first time-domain resource set of the first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set.

In one embodiment, the first signaling is a UL grant.

In one embodiment, the first signaling is Downlink Control Information (DCI).

In one embodiment, the number of bits included in the first bit block is the number of bits included in one TB.

In one embodiment, the number of bits included in the first bit block is one Transport Block Size (TBS).

In one embodiment, the first bit block consists of K first-type bit subblocks, the second bit block consists of K second-type bit subblocks that are obtained from the K first-type bit subblocks processed through channel coding, and the K is a positive integer greater than 1.

In one subembodiment, the bits not transmitted in the current second bit block include K1 second-type bit subblock(s) among the K second-type bit subblocks, the bits transmitted in the current second bit block include K2 second-type bit subblock(s) among the K second-type bit subblocks, the K1 and the K2 are both non-negative integers, and the summation of the K1 and the K2 is equal to K.

In one affiliated embodiment of the above subembodiment, the K1 second-type bit subblock(s) is(are all) used for generating the first radio signal.

In one affiliated embodiment of the above subembodiment, partial of the K1 second-type bit subblock(s) is(are) used for generating the first radio signal.

In one affiliated embodiment of the above subembodiment, L1 second-type bit subblock(s) among the K1 second-type bit subblock(s) is(are) used for generating the first radio signal, and the L1 is a positive integer not greater than the K1; the L1 second-type bit subblock(s) is(are) transmitted in L1 target time-frequency resource subset(s) respectively, frequency-domain resources occupied by the L1 target time-frequency resource subset(s) belong to the first frequency-domain resource set, and time-domain resources occupied by the L1 target time-frequency resource subset(s) belong to the first time-domain resource set.

In one example of the above affiliated embodiment, any two of the L1 target time-frequency resource subsets occupy a same number of multicarrier symbols in time domain.

In one example of the above affiliated embodiment, any two of the L1 target time-frequency resource subsets occupy a same number of subcarriers in frequency domain.

In one example of the above affiliated embodiment, a first target time-frequency resource subset and a second target time-frequency resource subset are two different target time-frequency resource subsets among the L1 target time-frequency resource subsets; a subcarrier set occupied by the first target time-frequency resource subset belongs to a first subband, and a subcarrier set occupied by the second target time-frequency resource subset belongs to a second subband; a pattern of the subcarrier set occupied by the first target time-frequency resource subset in the first subband is the same as a pattern of the subcarrier set occupied by the second target time-frequency resource subset in the second subband.

In one example of the above affiliated embodiment, a first target time-frequency resource subset and a second target time-frequency resource subset are two different target time-frequency resource subsets among the L1 target time-frequency resource subsets; a subcarrier set occupied by the first target time-frequency resource subset belongs to a first subband, and a subcarrier set occupied by the second target time-frequency resource subset belongs to a second subband; a frequency-domain position of the subcarrier set occupied by the first target time-frequency resource subset in the first subband is the same as a frequency-domain position of the subcarrier set occupied by the second target time-frequency resource subset in the second subband.

In one subembodiment, any two of the K1 first-type bit subblocks include a same number of bits.

In one subembodiment, any two of the K1 second-type bit subblocks include a same number of bits.

In one subembodiment, the K1 is equal to the K

In one embodiment, the bits not transmitted in a current second bit block include all bits in the second bit block.

In one embodiment, the bits not transmitted in a current second bit block include partial bits in the second bit block.

In one embodiment, the first signaling indicates the number of the bits included in the first bit block.

In one embodiment, the first signaling indicates a first Modulation and Coding Scheme (MCS), a first frequency-domain resource pool and a first time-domain resource pool; the first MCS, the first frequency-domain resource pool and the first time-domain resource pool are used together to determine the number of the bits included in the first bit block.

In one subembodiment, the first MCS is one MCS.

In one subembodiment, the first MCS is used for the channel coding through which the first bit block is processed.

In one subembodiment, the first frequency-domain resource set belongs to the first frequency-domain resource pool.

In one subembodiment, the first frequency-domain resource pool includes a positive integer number of subcarriers.

In one subembodiment, the first frequency-domain resource pool is deployed on unlicensed spectrum.

In one subembodiment, partial subcarriers in the first frequency-domain resource pool are deployed on unlicensed spectrum.

In one subembodiment, the first frequency-domain resource set includes a positive integer number of subcarriers.

In one subembodiment, the first frequency-domain resource set is deployed on unlicensed spectrum.

In one subembodiment, partial subcarriers in the first frequency-domain resource set are deployed on unlicensed spectrum.

In one embodiment, the channel coding includes rate matching.

In one embodiment, the channel coding includes puncturing.

In one embodiment, the channel coding is Low Density Parity Check (LDPC)-based coding.

In one embodiment, the channel coding is Turbo-based coding.

In one embodiment, the channel coding is based on polar coding.

In one embodiment, the second bit block is obtained after the first bit block is processed in sequence through Cyclic Redundancy Check (CRC) calculation, code block segmentation and code block CRC attachment, channel coding, rate matching and code block concatenation.

In one embodiment, the second bit block is obtained after the first bit block is processed through CRC calculation, code block segmentation and code block CRC attachment, channel coding, rate matching and code block concatenation.

In one embodiment, the second bit block is obtained after the first bit block is processed in sequence through CRC attachment, code block segmentation, Per-CB CRC attachment, channel coding, rate matching and code block concatenation.

In one embodiment, the second bit block is obtained after the first bit block is processed through CRC attachment, code block segmentation, Per-CB CRC attachment, channel coding, rate matching and code block concatenation.

In one embodiment, the first radio signal is obtained after partial or all bits included in the second bit block are processed in sequence through rate matching, scrambling, modulation, layer mapping, transform precoding, multi-antenna precoding, resource mapping and physical antenna mapping.

In one embodiment, the first radio signal is obtained after partial or all bits included in the second bit block are processed through rate matching, scrambling, modulation, layer mapping, transform precoding, multi-antenna precoding, resource mapping and physical antenna mapping.

In one embodiment, the first time-domain resource set is contiguous in time domain, and the end time of the first time-domain resource set is related to the number of bits not transmitted in the second bit block and the first frequency-domain resources.

In one embodiment, the number of bits not transmitted in the second bit block and the first frequency-domain resource set are used together to determine a first duration, and a duration of the first time-domain resource set is equal to a minimum value among the first duration and a first threshold.

In one subembodiment, the first threshold is in unit of microsecond.

In one subembodiment, the first threshold is in unit of millisecond.

In one subembodiment, the first threshold is in unit of the duration of one multicarrier symbol.

In one subembodiment, the first threshold is in unit of the duration of multiple multicarrier symbols.

In one embodiment, the first time-domain resource set includes a positive integer number of consecutive multicarrier symbols in time domain.

In one embodiment, the multicarrier symbol in the disclosure is a Single-Carrier Frequency Division Multiple Access (SC-FDMA) symbol.

In one embodiment, the multicarrier symbol in the disclosure is a Filter Bank Multi Carrier (FBMC) symbol.

In one embodiment, the multicarrier symbol in the disclosure is an OFDM symbol including a Cyclic Prefix (CP).

In one embodiment, the multicarrier symbol in the disclosure is a Discrete Fourier Transform Spreading Orthogonal Frequency Division Multiplexing (DFT-s-OFDM) symbol including a Cyclic Prefix (CP).

In one embodiment, the multicarrier symbol in the disclosure is a Discrete Fourier Transform Spreading Frequency Division Multiple Access (DFT-S-FDMA) symbol.

In one embodiment, the number of bits not transmitted in a current second bit block refers to: the number of bits in the second bit block that have not been transmitted by the UE by a start time of the first time-domain resource set.

In one embodiment, the number of bits not transmitted in a current second bit block refers to: the number of bits in the second bit block that have not been transmitted by the UE by an end time of completing the first listening.

In one embodiment, the phrase that the first time-domain resource set is related to a number of bits not transmitted in a current second bit block and the first frequency-domain resource set includes: the first time-domain resource set includes M1 multicarrier symbol(s), the first frequency-domain resource set includes N1 subcarrier(s), and the number of bits not transmitted in the current second bit block is in linear relation with a product of the M1 and the N1, wherein the M1 and the N1 are both positive integers.

In one subembodiment, the greater the number of bits not transmitted in the current second bit block, the bigger the product of the M1 and the N1; the less the number of bits not transmitted in the current second bit block, the smaller the product of the M1 and the N1.

In one embodiment, the phrase that the first time-domain resource set is related to a number of bits not transmitted in a current second bit block and the first frequency-domain resource set includes: the first time-domain resource set includes M1 multicarrier symbol(s), the first frequency-domain resource set includes N1 subcarrier(s), and the UE determines the value of the N1 by performing the first listening; in the condition that the value of the N1 keeps unchanged, the number of bits not transmitted in the current second bit block is in linear relation with the M1, wherein the M1 and the N1 are both positive integers.

In one subembodiment, the greater the number of bits not transmitted in the current second bit block, the bigger the N1; the less the number of bits not transmitted in the current second bit block, the smaller the N1.

In one embodiment, time-domain resources occupied by the first time-domain resource set have a duration not greater than one MCOT.

In one embodiment, a number of multicarrier symbols included in the first time-domain resource set is a maximum number of multicarrier symbols of which the total duration is not greater than a MCOT.

In one embodiment, the first frequency-domain resource set belongs to a first frequency-domain resource pool, frequency-domain resources occupied by the first frequency-domain resource pool include Q subbands, and the UE performs first listening on the Q subbands simultaneously to determine the first frequency-domain resource set, wherein the Q is a positive integer greater than 1.

In one subembodiment, the Q in the disclosure is equal to the K in the disclosure.

In one subembodiment, the Q in the disclosure is related to the K in the disclosure.

In one subembodiment, the first signaling is used for indicating the Q subbands.

In one embodiment, time-domain resources occupied by the first time-domain resource set are contiguous.

In one embodiment, the first time-domain resource set includes a positive integer number of consecutive multicarrier symbols, and the positive integer number of consecutive multicarrier symbols are all occupied by the UE.

In one embodiment, the first time-domain resource set includes a positive integer number of consecutive multicarrier symbols, and the positive integer number of consecutive multicarrier symbols are all occupied by the first radio signal.

In one embodiment, frequency-domain resources occupied by any two of the Q subbands in the disclosure are orthogonal.

Embodiment 2

Figure 2:
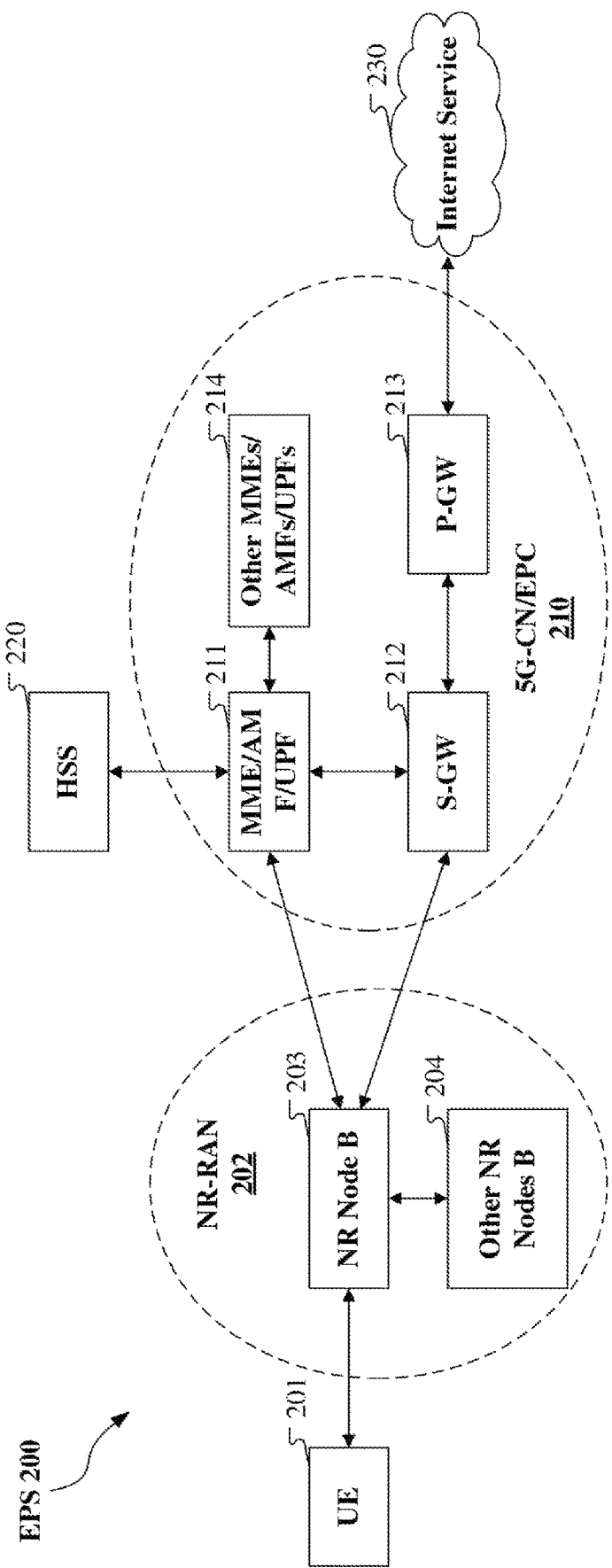
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-terrestrial base statin communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports wireless communications performing data transmission on unlicensed spectrum.

In one subembodiment, the gNB 203 supports wireless communications performing data transmission on unlicensed spectrum.

In one subembodiment, the UE 201 supports subband based LTB.

In one subembodiment, the UE 201 supports performing wireless transmission on multiple subbands simultaneously.

In one subembodiment, the gNB 203 supports receiving radio signals on multiple subbands simultaneously.

In one subembodiment, any one of the Q subbands in the disclosure is one Bandwidth Part (BWP).

In one subembodiment, any one of the Q subbands in the disclosure is one Component Carrier (CC).

In one subembodiment, one BWP includes a positive integer number of subbands in the disclosure.

In one subembodiment, one CC includes a positive integer number of subbands in the disclosure.

Embodiment 3

Figure 3:
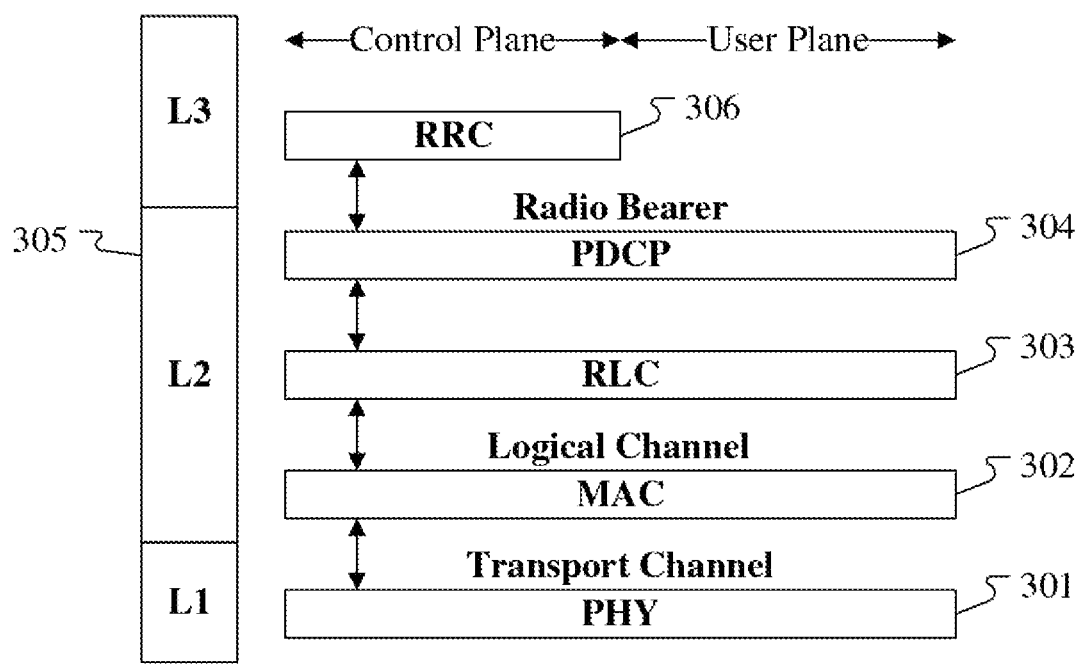
FIG. 3 is a diagram illustrating an embodiment of a radio protocol architecture of a user plane and a control plane according to one embodiment of the disclosure.

Embodiment 3 illustrates an example of a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3 layer). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated by the PHY 301.

In one subembodiment, the first listening in the disclosure is performed on the PHY 301.

In one subembodiment, the first radio signal in the disclosure is generated by the MAC sublayer 302.

In one subembodiment, the second radio signal in the disclosure is generated by the MAC sublayer 302.

In one subembodiment, the second listening in the disclosure is performed on the PHY 301.

In one subembodiment, the third radio signal in the disclosure is generated by the PHY 301.

In one subembodiment, the third radio signal in the disclosure is generated by the MAC sublayer 302.

In one subembodiment, the second signaling in the disclosure is generated by the PHY 301.

In one subembodiment, the second signaling in the disclosure is generated by the MAC sublayer 302.

Embodiment 4

Figure 4:
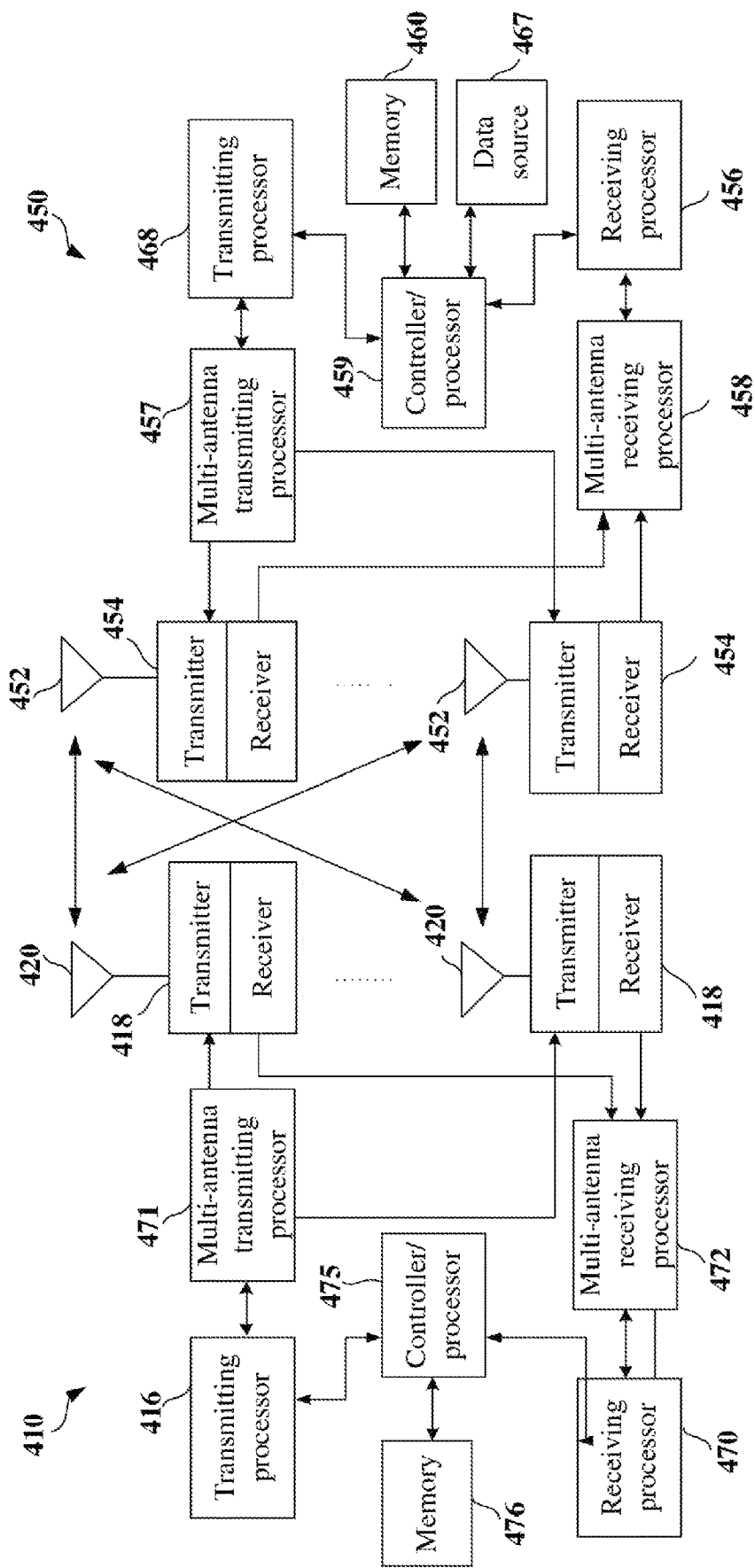
FIG. 4 is a diagram illustrating an evolved node B and a UE according to one embodiment of the disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides functions of Layer 2. In DL transmission, the controller/processor 475 provides header compression, encryption, packet segmentation and reordering, multiplexing between a logical channel and a transport channel, and a radio resource allocation for the UE 450 based on various priority metrics. The controller/processor 475 is also in charge of HARQ operation, retransmission of lost packets, and signalings to the UE 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the UE 450 side and mappings to signal clusters corresponding to different modulation schemes (i.e., BPSK, QPSK, M-PSK M-QAM, etc.). The multi-antenna transmitting processor 471 processes the encoded and modulated symbols with digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams with a transmitting analog precoding/beamforming operation. Each transmitter 418 converts a baseband multicarrier symbol stream provided by the multi-antenna transmitting processor 471 into a radio frequency stream and then provides it to different antennas 420.

In DL transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 with a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In DL transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 illustrates all protocol layers above the L2 layer. Similar as the transmitting function of the gNB 410 described in DL transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the gNB 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In Uplink (UL) transmission, the function of the gNB 410 is similar as the receiving function of the UE 450 described in the DL transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In UL transmission, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one subembodiment, the UE 450 includes at least one processor and at least one memory. The at least one memory includes computer program codes. The at least one memory and the computer program codes are configured to be used in collaboration with the at least one processor. The UE 450 at least receives a first signaling, the first signaling being used for determining a number of bits included in a first bit block, then performs first listening to determine that a first frequency-domain resource set is available for wireless transmission, and finally transmits a first radio signal in a first time-domain resource set of the first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set.

In one subembodiment, the UE 450 includes a memory that stores a computer readable instruction program. The computer readable instruction program generates an action when executed by at least one processor. The action includes: receiving a first signaling, the first signaling being used for determining a number of bits included in a first bit block; then performing first listening to determine that a first frequency-domain resource set is available for wireless transmission; and finally transmitting a first radio signal in a first time-domain resource set of the first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set.

In one subembodiment, the gNB 410 includes at least one processor and at least one memory. The at least one memory includes computer program codes. The at least one memory and the computer program codes are configured to be used in collaboration with the at least one processor. The gNB 410 at least first transmits a first signaling, the first signaling being used for determining a number of bits included in a first bit block, and then receives a first radio signal in a first time-domain resource set of a first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set.

In one subembodiment, the gNB 410 includes a memory that stores a computer readable instruction program. The computer readable instruction program generates an action when executed by at least one processor. The action includes: first transmitting a first signaling, the first signaling being used for determining a number of bits included in a first bit block, and then receiving a first radio signal in a first time-domain resource set of a first frequency-domain resource set; a second bit block is used for generating the first radio signal, and the second bit block is obtained after the first bit block is processed through channel coding; and the first time-domain resource set is related to a number of bits not transmitted in a current second bit block and the first frequency-domain resource set.

In one embodiment, at least one of the antenna 452, the receiver 454, the multi-antenna receiving processor 458 and the receiving processor 456 is used for receiving the first signaling in the disclosure; and at least one of the antenna 420, the transmitter 418, the multi-antenna transmitting processor 471 and the transmitting processor 416 is used for transmitting the first signaling in the disclosure.

In one embodiment, at least one of the antenna 452, the receiver 454, the multi-antenna receiving processor 458 and the receiving processor 456 is used for performing the first listening in the disclosure to determine that the first frequency-domain resource set in the disclosure is available for wireless transmission.

In one embodiment, at least one of the antenna 452, the transmitter 454, the multi-antenna transmitting processor 457 and the transmitting processor 468 is used for transmitting a first radio signal in a first time-domain resource set of the first frequency-domain resource set; and at least one of the antenna 420, the receiver 418, the multi-antenna receiving processor 472 and the receiving processor 470 is used for receiving a first radio signal in a first time-domain resource set of a first frequency-domain resource set.

In one embodiment, at least one of the antenna 452, the receiver 454, the multi-antenna receiving processor 458 and the receiving processor 456 is used for performing the second listening in the disclosure to determine that a second frequency-domain resource set is available for wireless transmission.

In one embodiment, at least one of the antenna 452, the transmitter 454, the multi-antenna transmitting processor 457 and the transmitting processor 468 is used for transmitting a second radio signal in a second time-domain resource set of the second frequency-domain resource set; and at least one of the antenna 420, the receiver 418, the multi-antenna receiving processor 472 and the receiving processor 470 is used for receiving a second radio signal in a second time-domain resource set of a second frequency-domain resource set.

In one embodiment, at least one of the multi-antenna transmitting processor 457, the transmitting processor 458 and the controller/processor 459 is used for terminating transmission of any bit in the second bit block that has not been transmitted yet by an end time of a first time window.

In one embodiment, at least one of the antenna 452, the receiver 454, the multi-antenna receiving processor 458 and the receiving processor 456 is used for receiving a second signaling, the second signaling being used for indicating whether the first bit block is correctly received; and at least one of the antenna 420, the transmitter 418, the multi-antenna transmitting processor 471 and the transmitting processor 416 is used for transmitting a second signaling, the second signaling being used for indicating whether the first bit block is correctly received.

In one embodiment, at least one of the antenna 452, the transmitter 454, the multi-antenna transmitting processor 457 and the transmitting processor 468 is used for transmitting a third radio signal; and at least one of the antenna 420, the receiver 418, the multi-antenna receiving processor 472 and the receiving processor 470 is used for receiving a third radio signal.

Embodiment 5

Figure 5:
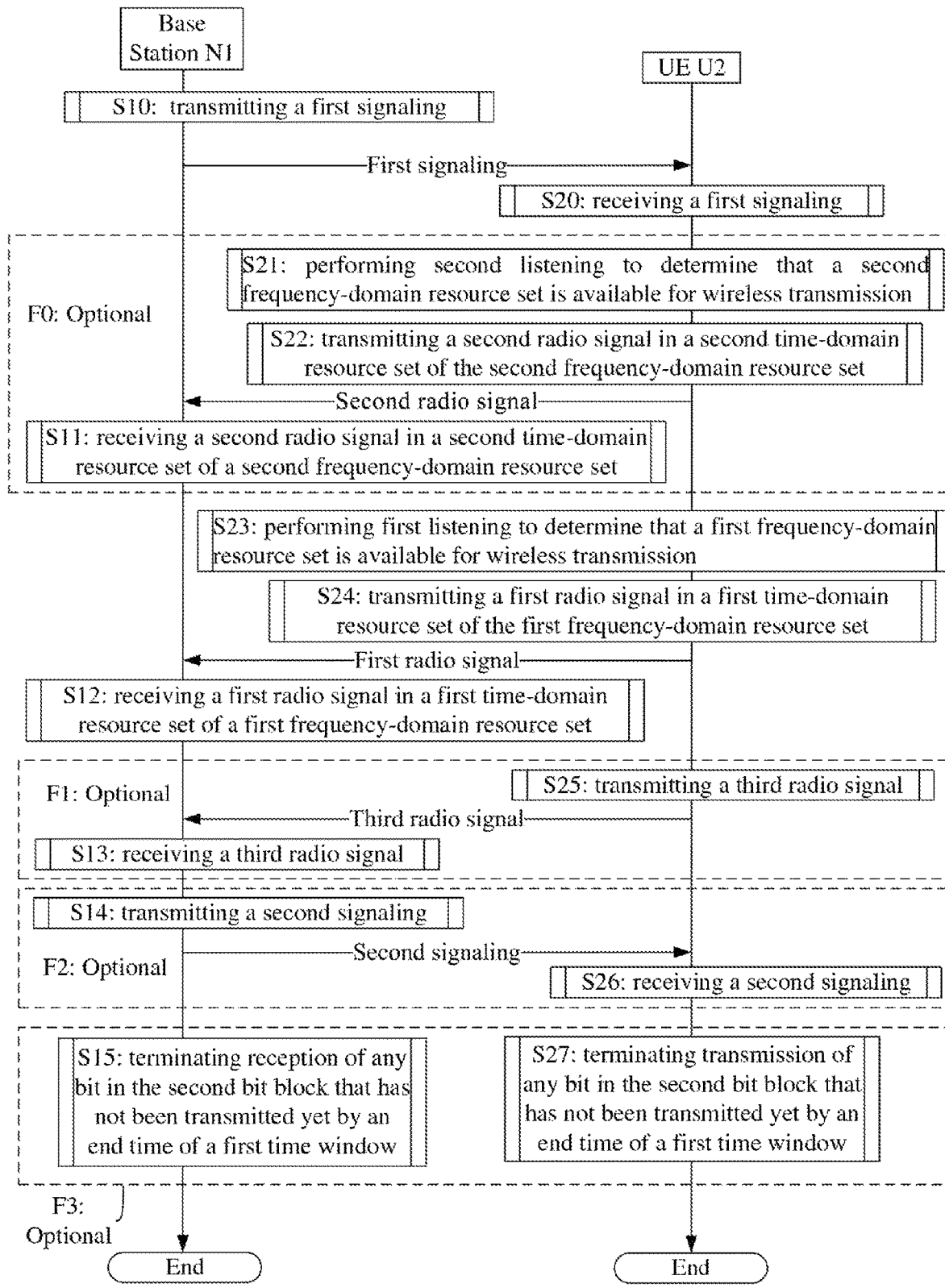
FIG. 5 is a flowchart of a first radio signal according to one embodiment of the disclosure.

Embodiment 5 illustrates an example of a flowchart of a first radio signal, as shown in FIG. 5. In FIG. 5, a base station N1 is a maintenance base station for a serving cell of a UE U2. In FIG. 5, steps in boxes F0, F1, F2 and F3 are optional.

The base station N1 transmits a first signaling in S10, the first signaling being used for determining a number of bits included in a first bit block, receives a second radio signal in a second time-domain resource set of a second frequency-domain resource set in S11, receives a first radio signal in a first time-domain resource set of a first frequency-domain resource set in S12, receives a third radio signal in S13, transmits a second signaling in S14, the second signaling being used for indicating whether the first bit block is correctly received, and terminates reception of any bit in the second bit block that has not been transmitted yet by an end time of a first time window in S15.

The UE U2 receives a first signaling in S20, the first signaling being used for determining a number of bits included in a first bit block, performs second listening to determine that a second frequency-domain resource set is available for wireless transmission in S21, and transmits a second radio signal in a second time-domain resource set of the second frequency-domain resource set in S22, performs first listening to determine that a first frequency-domain resource set is available for wireless transmission in S23, transmits a first radio signal in a first time-domain resource set of the first frequency-domain resource set in S24, transmits a third radio signal in S25, receives a second signaling in S26, the second signaling being used for indicating whether the first bit block is correctly received, and terminates transmission of any bit in the second bit block that has not been transmitted yet by an end time of a first time window in S27.

In Embodiment 5, a second bit block is used for generating the first radio signal, and the second bit block is obtained after the first bit block is processed through channel coding; the first time-domain resource set is related to a number of bits not transmitted in a current second bit block and the first frequency-domain resource set; the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively; the first signaling indicates the first time window, and the first time window includes the first time-domain resource set; the third radio signal indicates at least one of the first frequency-domain resource set and the first time-domain resource set; the second signaling is transmitted behind the first time window, and the UE does not transmit any bit in the second bit block between the end time of the first time window and a transmit start time of the second signaling.

In one embodiment, the second time-domain resource set includes a positive integer number of consecutive multicarrier symbols in time domain.

In one embodiment, a duration of the second time-domain resource set is related to a type of the second listening.

In one subembodiment, the type of the second listening is one of Category 2 and Category 4.

In one subembodiment, the type of the second listening is one of a wideband LBT and a narrowband LBT.

In one embodiment, a duration of the second time-domain resource set is configurable.

In one embodiment, a number of multicarrier symbols included in the second time-domain resource set is a maximum number of multicarrier symbols of which the total duration is not greater than a MCOT.

In one embodiment, the number of bits not transmitted in a current second bit block refers to: the number of bits in the second bit block that have not been transmitted by the UE U2 by an end time of the second time-domain resource set.

In one embodiment, time-domain resources occupied by the first time-domain resource set and time-domain resources occupied by the second time-domain resource set are discrete.

In one embodiment, the phrase that time-domain resources occupied by the first time-domain resource set and time-domain resources occupied by the second time-domain resource set are discrete includes: time-domain resources that are not occupied by the UE U2 exist between the time-domain resources occupied by the first time-domain resource set and the time-domain resources occupied by the second time-domain resource set.

In one embodiment, the phrase that time-domain resources occupied by the first time-domain resource set and time-domain resources occupied by the second time-domain resource set are discrete includes: multicarrier symbols that are not occupied by the UE U2 exist between the multicarrier symbol set occupied by the first time-domain resource set and the multicarrier symbol set occupied by the second time-domain resource set.

In one embodiment, a start time of time-domain resources occupied by the first time-domain resource set is time T1, an end time of time-domain resources occupied by the second time-domain resource set is time T2, a duration from the time T1 to the time T2 is T milliseconds, and the T milliseconds is greater than one MCOT.

In one embodiment, time-domain resources occupied by the second time-domain resource set are contiguous.

In one embodiment, the second time-domain resource set includes a positive integer number of consecutive multicarrier symbols, and the positive integer number of consecutive multicarrier symbols are all occupied by the UE U2.

In one embodiment, the second time-domain resource set includes a positive integer number of consecutive multicarrier symbols, and the positive integer number of consecutive multicarrier symbols are all occupied by the second radio signal.

In one embodiment, the first radio signal and the second radio signal employ a same Hybrid Automatic Repeat Request (HARM) process number (Process ID).

In one embodiment, the first signaling is used for indicating a first time-domain resource pool, and the first time-domain resource pool includes the first time-domain resource set and the second time-domain resource set.

In one embodiment, the first signaling is used for indicating a first frequency-domain resource pool and a first time-domain resource pool, frequency-domain resource occupied by the first frequency-domain resource set belong to the first frequency-domain resource pool, and time-domain resources occupied by the first time-domain resource set belong to the first time-domain resource pool.

In one subembodiment, the base station N1 determines the first frequency-domain resource set from the first frequency-domain resource pool through an energy detection, and the base station N1 determines the first time-domain resource set from the first time-domain resource pool through an energy detection.

In one subembodiment, the base station N1 determines the first frequency-domain resource set from the first frequency-domain resource pool through a sequence detection, and the base station N1 determines the first time-domain resource set from the first time-domain resource pool through a sequence detection.

In one affiliated embodiment of the above subembodiment, the sequence detection includes a sequence detection based on a Demodulation Reference Signal (DMRS).

In one subembodiment, the base station N1 determines the first frequency-domain resource set from the first frequency-domain resource pool through an explicit signaling, and the base station N1 determines the first time-domain resource set from the first time-domain resource pool through an explicit signaling.

In one affiliated embodiment of the above subembodiment, the explicit signaling is transmitted by the UE U2.

In one affiliated embodiment of the above subembodiment, the explicit signaling includes the third radio signal in the disclosure.

In one embodiment, the first signaling is used for indicating a first frequency-domain resource pool and a first time-domain resource pool, frequency-domain resource occupied by the second frequency-domain resource set belong to the first frequency-domain resource pool, and time-domain resources occupied by the second time-domain resource set belong to the first time-domain resource pool.

In one subembodiment, the base station N1 determines the second frequency-domain resource set from the first frequency-domain resource pool through an energy detection, and the base station N1 determines the second time-domain resource set from the first time-domain resource pool through an energy detection.

In one subembodiment, the base station N1 determines the second frequency-domain resource set from the first frequency-domain resource pool through a sequence detection, and the base station N1 determines the second time-domain resource set from the first time-domain resource pool through a sequence detection.

In one affiliated embodiment of the above subembodiment, the sequence detection includes a sequence detection based on a DMRS.

In one subembodiment, the base station N1 determines the second frequency-domain resource set from the first frequency-domain resource pool through an explicit signaling, and the base station N1 determines the second time-domain resource set from the first time-domain resource pool through an explicit signaling.

In one affiliated embodiment of the above subembodiment, the explicit signaling is transmitted by the UE U2.

In one affiliated embodiment of the above subembodiment, the explicit signaling includes the third radio signal in the disclosure.

In one embodiment, the first time window includes a positive integer number of consecutive multicarrier symbols in time domain.

In one embodiment, the first time window includes a positive integer number of consecutive slots in time domain.

In one embodiment, the first time window includes the second time-domain resource set.

In one embodiment, the first time window includes the first time-domain resource set.

In one embodiment, the first time window includes the first time-domain resource pool.

In one embodiment, the operation of terminating transmission of any bit in the second bit block that has not been transmitted yet by an end time of a first time window includes: releasing a buffer occupied by the bit(bits) in the second bit block that has(have) not been transmitted yet by the end time of the first time window.

In one embodiment, the operation of terminating transmission of any bit in the second bit block that has not been transmitted yet by an end time of a first time window includes: releasing a buffer occupied by the second bit block.

In one embodiment, the third radio signal indicates the first frequency-domain resource set.

In one embodiment, the third radio signal indicates the first time-domain resource set.

In one embodiment, the third radio signal indicates the first frequency-domain resource set and the first time-domain resource set.

In one subembodiment of the above three embodiments, the third radio signal indicates frequency-domain positions of subcarriers occupied by the first frequency-domain resource set.

In one subembodiment of the above three embodiments, the third radio signal indicates frequency-domain positions of Resource Block (RBs) occupied by the first frequency-domain resource set.

In one subembodiment of the above three embodiments, the third radio signal indicates time-domain positions of multicarrier symbols occupied by the first time-domain resource set.

In one embodiment, the third radio signal includes Uplink Control Information (UCI), and the UCI includes at least one of a Hybrid Automatic Repeat request-Acknowledgement (HARQ-ACK) and Channel State Information (CSI).

In one embodiment, the third radio signal includes a DMRS of the first radio signal.

In one embodiment, the first frequency-domain resource set is deployed on unlicensed spectrum, and the third radio signal is transmitted on licensed spectrum.

In one subembodiment, the third radio signal is transmitted on a Physical Uplink Control Channel (PUCCH).

In one subembodiment, the third radio signal is transmitted on a Short Latency Physical Uplink Control Channel (sPUCCH).

In one subembodiment, the third radio signal is transmitted on a Physical Uplink Shared Channel (PUSCH).

In one embodiment, the first frequency-domain resource set is deployed on unlicensed spectrum, and the third radio signal is transmitted in the first frequency-domain resource set.

In one subembodiment, the third radio signal and the first radio signal are transmitted on one same physical layer channel.

In one affiliated embodiment of the above subembodiment, the one same physical layer channel is a PUSCH.

In one affiliated embodiment of the above subembodiment, the one same physical layer channel is an sPUSCH.

In one embodiment, the first frequency-domain resource pool in the disclosure includes Q subbands, the first radio signal includes L1 first radio sub-signal(s), and the L1 first radio sub-signal(s) is(are) transmitted in Q1 subband(s) among the Q subbands; the third radio signal is used for determining positions of time-frequency resources occupied by the L1 first radio sub-signal(s); the Q is a positive integer greater than 1, and the Q1 is a positive integer not greater than the Q; and the L1 is a positive integer.

In one embodiment, the first radio signal includes L1 first radio sub-signal(s), the second bit block includes K second-type bit subblocks, and the L1 first radio sub-signal(s) is(are) generated by L1 second-type bit subblock(s) among the K second-type bit subblocks respectively; the third radio signal is used for determining sequence number(s) of the L1 second-type bit subblock(s) in the K second-type bit subblocks; the K is a positive integer greater than 1, and the L1 is a positive integer not greater than the K.

In one subembodiment of any one of the above two embodiments, any one bit in the second bit block can be used for generating at most one of the L1 first radio sub-signal(s) only.

In one subembodiment of any one of the above two embodiments, the third radio signal is used for determining positions of time-frequency resources occupied by the L1 first radio sub-signal(s).

In one subembodiment of any one of the above two embodiments, the third radio signal is used for determining sequence number(s) of the L1 second-type bit subblock(s) in the K second-type bit subblocks.

In one subembodiment of any one of the above two embodiments, any one of the L1 first radio sub-signal(s) includes a positive integer number of modulation symbols.

In one subembodiment of any one of the above two embodiments, the L1 first radio sub-signal(s) is(are) transmitted in Q1 subband(s) among the Q subbands respectively, wherein the L1 is equal to the Q1.

In one subembodiment of any one of the above two embodiments, the third radio includes L1 third radio sub-signal(s), and the L1 third radio sub-signal(s) correspond(s) to the L1 first radio sub-signal(s) respectively.

In one affiliated embodiment of the above subembodiment, the L1 third radio sub-signal(s) is(are) used for indicating position(s) of subband(s) occupied by the L1 first radio sub-signal(s) in the Q subbands respectively.

In one affiliated embodiment of the above subembodiment, the L1 third radio sub-signal(s) is(are) used for indicating position(s) of time-domain resources occupied by the L1 first radio sub-signal(s) in the first time-domain resource pool in the disclosure respectively.

In one affiliated embodiment of the above subembodiment, the L1 third radio sub-signal(s) is(are) used for indicating sequence number(s) of the L1 second-type bit subblock(s) generating the L1 first radio sub-signal(s) in the K second-type bit subblocks respectively.

In one affiliated embodiment of the above subembodiment, the L1 third radio sub-signal(s) is(are) one-to-one corresponding to the L1 first radio sub-signal(s).

In one affiliated embodiment of the above subembodiment, each of the L1 third radio sub-signal(s) and a corresponding first radio sub-signal are transmitted in one same resource unit in the disclosure.

In one affiliated embodiment of the above subembodiment, each of the L1 third radio sub-signal(s) and a corresponding first radio sub-signal are transmitted by a same antenna port.

In one affiliated embodiment of the above subembodiment, each of the L1 third radio sub-signal(s) and a corresponding first radio sub-signal are transmitted on one same physical layer channel.

In one example of the above affiliated embodiment, the one same physical layer channel is a PUCCH.

In one example of the above affiliated embodiment, the one same physical layer channel is a PUSCH.

In one example of the above affiliated embodiment, the one same physical layer channel is an sPUCCH.

In one example of the above affiliated embodiment, the one same physical layer channel is an sPUSCH.

In one subembodiment of any one of the above two embodiments, the first radio signal includes Q1 first-type radio sub-signal set(s), any one of the L1 first radio sub-signal(s) belongs to one of the Q1 first-type radio sub-signal set(s) only, any one of the Q1 first-type radio sub-signal set(s) consists of a positive integer number of first radio sub-signal(s) among the L1 first radio sub-signal(s), the Q1 is less than the L1, and the Q1 first-type radio sub-signal set(s) is(are) transmitted in Q1 subband(s) among the Q subbands respectively; the third radio signal includes Q1 third radio sub-signal(s), and the Q1 third radio sub-signal(s) correspond(s) to the Q1 first-type radio sub-signal set(s) respectively.

In one affiliated embodiment of the above subembodiment, the Q1 third radio sub-signal(s) is(are) used for indicating position(s) of subband(s) occupied by the Q1 first-type radio sub-signal set(s) in the Q subbands respectively.

In one affiliated embodiment of the above subembodiment, the Q1 third radio sub-signal(s) is(are) used for indicating time-domain position(s) of time-domain resources occupied by the Q1 first-type radio sub-signal set(s) in the first time-domain resource pool in the disclosure respectively.

In one affiliated embodiment of the above subembodiment, a given third radio sub-signal is any one of the Q1 third radio sub-signal(s), the given third radio sub-signal corresponds to a given first-type radio sub-signal set among the Q1 first-type radio sub-signal set(s), and the given third radio sub-signal is used for indicating sequence numbers of all second-type bit subblocks generating the given first-type radio sub-signal set in the K second-type bit subblocks.

In one subembodiment of any one of the above two embodiments, the first radio signal includes P1 second-type radio sub-signal set(s), any one of the L1 first radio sub-signal(s) belongs to one of the P1 second-type radio sub-signal set(s) only, any one of the P1 second-type radio sub-signal set(s) consists of a positive integer number of first radio sub-signal(s) among the L1 first radio sub-signal(s), the P1 is less than the L1, and the P1 second-type radio sub-signal set(s) is(are) transmitted in P1 time-domain resource subset(s) among P time-domain resource subset(s) included in the first time-domain resource pool in the disclosure respectively; the third radio signal includes P1 third radio sub-signal(s), and the P1 third radio sub-signal(s) correspond(s) to the P1 second-type radio sub-signal set(s) respectively.

In one affiliated embodiment of the above subembodiment, the P1 third radio sub-signal(s) is(are) used for indicating time-domain position(s) of P1 time-domain resource subset(s) occupied by the P1 second-type radio sub-signal set(s) in the first time-domain resource pool.

In one affiliated embodiment of the above subembodiment, the P1 third radio sub-signal(s) is(are) used for indicating frequency-domain position(s) of frequency-domain resources occupied by the P1 second-type radio sub-signal set(s) in the first frequency-domain resource pool.

In one affiliated embodiment of the above subembodiment, a given third radio sub-signal is any one of the P1 third radio sub-signal(s), the given third radio sub-signal corresponds to a given second-type radio sub-signal set among the P1 second-type radio sub-signal set(s), and the given third radio sub-signal is used for indicating sequence numbers of all second-type bit subblocks generating the given second-type radio sub-signal set in the K second-type bit subblocks.

In one embodiment, the first frequency-domain resource pool in the disclosure includes Q subbands, the first time-domain resource pool includes P time-domain resource subsets, and the first radio signal includes L1 first radio sub-signal(s); the Q subbands and the P time-domain resource subsets constitute (Q*P) resource units, and any one of the L1 first radio sub-signal(s) is transmitted in one of the (Q*P) resource units; the second bit block includes K second-type bit subblocks, the L1 first radio sub-signal(s) is(are) generated by L1 second-type bit subblock(s) among the K second-type bit subblocks respectively; the Q is a positive integer greater than 1, the P is a positive integer greater than 1, the K is a positive integer greater than 1, and the L1 is a positive integer not greater than the K.

In one subembodiment, the L1 first radio sub-signal(s) occupies(occupy) L1 different resources unit(s) among the (Q*P) resource units.

In one subembodiment, the third radio signal is used for indicating position(s) of the L1 resource unit(s) occupied by the L1 first radio sub-signal(s) in the (Q*P) resource units.

In one affiliated embodiment of the above subembodiment, the third radio signal is transmitted behind the first radio signal, the third radio signal includes (Q*P) bits, the (Q*P) bits are one-to-one corresponding to the (Q*P) resource units, the (Q*P) bits included in the third radio signal include L1 1(1's), and the L1 1(1's) is(are) used for indicating the L1 resource unit(s) occupied by the L1 first radio sub-signal(s).

In one affiliated embodiment of the above subembodiment, the third radio signal includes L1 third radio sub-signal(s), and the L1 third radio sub-signal(s) are one-to-one corresponding to the L1 first radio sub-signal(s); a given third radio sub-signal is any one of the L1 third radio sub-signal(s), and the given third radio sub-signal corresponds to a given first radio sub-signal among the L1 first radio sub-signal(s); and the third given radio sub-signal is used for indicating a position of a resource unit occupied by the given first radio sub-signal in the (Q*P) resource units.

In one subembodiment, the third radio signal is used for indicating position(s) of the L1 second-type bit subblock(s) in the K second-type bit subblocks.

In one affiliated embodiment of the above subembodiment, the third radio signal is transmitted behind the first radio signal, the third radio signal includes K bits, the K bits are one-to-one corresponding to the K second-type bit subblocks, the K bits included in the third radio signal include L1 1(1's), and the L1 1(1's) is(are) used for indicating positions of the L1 second-type bit subblock(s) generating the L1 first radio sub-signal(s) in the K second-type bit subblocks.

In one affiliated embodiment of the above subembodiment, the third radio signal includes L1 third radio sub-signal(s), and the L1 third radio sub-signal(s) are one-to-one corresponding to the L1 first radio sub-signal(s); a given third radio sub-signal is any one of the L1 third radio sub-signal(s), and the given third radio sub-signal corresponds to a given first radio sub-signal among the L1 first radio sub-signal(s); and the third given radio sub-signal is used for indicating a second-type bit subblock generating the given first radio sub-signal from the K second-type bit subblocks.

In one embodiment, the first frequency-domain resource pool in the disclosure includes Q subbands, the first time-domain resource pool includes P time-domain resource subsets, and the first radio signal includes L1 first radio sub-signal(s); the Q subbands and the P time-domain resource subsets constitute (Q*P) resource units, and any one of the L1 first radio sub-signal(s) is transmitted in one of the (Q*P) resource units; the first radio signal includes Q1 first-type radio sub-signal set(s), any one of the L1 first radio sub-signal(s) belongs to one of the Q1 first-type radio sub-signal set(s) only, any one of the Q1 first-type radio sub-signal set(s) consists of a positive integer number of first radio sub-signal(s) among the L1 first radio sub-signal(s); the Q1 is less than the L1, and the Q1 first-type radio sub-signal set(s) is(are) transmitted in Q1 subband(s) among the Q subbands respectively; the third radio signal includes Q1 third radio sub-signal(s), and the Q1 third radio sub-signal(s) correspond(s) to the Q1 first-type radio sub-signal set(s) respectively.

In one subembodiment, the Q1 first-type radio sub-signal sets are orthogonal in frequency domain.

In one subembodiment, a given third radio sub-signal is any one of the Q1 third radio sub-signal(s), the given third radio sub-signal corresponds to a given first-type radio sub-signal set among the Q1 first-type radio sub-signal set(s), and the given third radio sub-signal is used for indicating positions of resource units occupied by the given first-type radio sub-signal set in the (Q*P) resource units.

In one subembodiment, a given third radio sub-signal is any one of the Q1 third radio sub-signal(s), the given third radio sub-signal corresponds to a given first-type radio sub-signal set among the Q1 first-type radio sub-signal set(s), and the given third radio sub-signal is used for indicating sequence numbers of all second-type bit subblocks generating the given first-type radio sub-signal set in the K second-type bit subblocks.

In one embodiment, the first frequency-domain resource pool in the disclosure includes Q subbands, the first time-domain resource pool includes P time-domain resource subsets, and the first radio signal includes L1 first radio sub-signal(s); the Q subbands and the P time-domain resource subsets constitute (Q*P) resource units, and any one of the L 1 first radio sub-signal(s) is transmitted in one of the (Q*P) resource units; the first radio signal includes P1 second-type radio sub-signal set(s), any one of the L1 first radio sub-signal(s) belongs to one of the P1 second-type radio sub-signal set(s) only, any one of the P1 second-type radio sub-signal set(s) consists of a positive integer number of first radio sub-signal(s) among the L1 first radio sub-signal(s), the P1 is less than the L1, and the P1 second-type radio sub-signal set(s) is(are) transmitted in P1 time-domain resource subset(s) among P time-domain resource subset(s) respectively; the third radio signal includes P1 third radio sub-signal(s), and the P1 third radio sub-signal(s) correspond(s) to the P1 second-type radio sub-signal set(s) respectively.

In one subembodiment, the P1 first-type radio sub-signal sets are orthogonal in time domain.

In one subembodiment, a given third radio sub-signal is any one of the P1 third radio sub-signal(s), the given third radio sub-signal corresponds to a given second-type radio sub-signal set among the P1 second-type radio sub-signal set(s), and the given third radio sub-signal is used for indicating positions of resource units occupied by the given second-type radio sub-signal set in the (Q*P) resource units.

In one affiliated embodiment of the above subembodiment, the P1 third radio sub-signal(s) is(are) used for indicating frequency-domain position(s) of frequency-domain resources occupied by the P1 second-type radio sub-signal set(s) in the first frequency-domain resource pool respectively.

In one subembodiment, a given third radio sub-signal is any one of the P1 third radio sub-signal(s), the given third radio sub-signal corresponds to a given second-type radio sub-signal set among the P1 second-type radio sub-signal set(s), and the given third radio sub-signal is used for indicating sequence numbers of all second-type bit subblocks generating the given first-type radio sub-signal set in the K second-type bit subblocks.

In one embodiment, the first frequency-domain resource pool in the disclosure includes Q subbands, the first radio signal includes L1 first radio sub-signal(s), and the L1 first radio sub-signal(s) is(are) transmitted in Q1 subband(s) among the Q subbands; the second radio signal includes L2 second radio sub-signal(s), and the L2 second radio sub-signal(s) is(are) transmitted in Q2 subband(s) among the Q subbands; the third radio signal is used for determining positions of time-frequency resources occupied by the L1 first radio sub-signal(s); and the third radio signal is used for determining positions of time-frequency resources occupied by the L2 second radio sub-signal(s); the Q is a positive integer greater than 1, and the Q1 is a positive integer not greater than the Q; the L1 and the L2 are both positive integers.

In one subembodiment, at least one of the Q1 subband(s) is the same as one of the Q2 subband(s).

In one subembodiment, the Q1 subband(s) and the Q2 subband(s) are orthogonal.

In one embodiment, the first radio signal includes L1 first radio sub-signal(s), the second bit block includes K second-type bit subblocks, and the L1 first radio sub-signal(s) is(are) generated by L1 second-type bit subblock(s) among the K second-type bit subblocks respectively; the second radio signal includes L2 second radio sub-signal(s), the second bit block includes K second-type bit subblocks, and the L2 second radio sub-signal(s) is(are) generated by L2 second-type bit subblock(s) among the K second-type bit subblocks; the third radio signal is used for determining sequence number(s) of the L1 second-type bit subblock(s) in the K second-type bit subblocks, and the third radio signal is used for determining sequence number(s) of the L2 second-type bit subblock(s) in the K second-type bit subblocks; the K is a positive integer greater than 1, the L1 and the L2 are both positive integers, and the summation of the L1 and the L2 is not greater than the K.

In one subembodiment, any one of the L1 second-type bit subblock(s) is different from any one of the L2 second-type bit subblock(s).

In one embodiment, the first frequency-domain resource pool in the disclosure includes Q subbands, the first time-domain resource pool includes P time-domain resource subsets, the first radio signal includes L1 first radio sub-signal(s), and the second radio signal includes L2 second radio sub-signal(s); the Q subbands and the P time-domain resource subsets constitute (Q*P) resource units, any one of the L1 first radio sub-signal(s) is transmitted in one of the (Q*P) resource units, and any one of the L2 second radio sub-signal(s) is transmitted in one of the (Q*P) resource units; the L1 first radio sub-signal(s) and the L2 second radio sub-signal(s) are transmitted in (L1+L2) resource units among the (Q*P) resource units; the second bit block includes K second-type bit subblocks, the L1 first radio sub-signal(s) and the L2 second radio sub-signal(s) are generated by (L1+L2) different second-type bit subblocks among the K second-type bit subblocks respectively; the Q is a positive integer greater than 1, the P is a positive integer greater than 1, the K is a positive integer greater than 1, the L1 and the L2 are positive integers, and the summation of the L1 and the L2 is not greater than the K.

In one subembodiment, the third radio signal is used for indicating positions of the (L1+L2) resource units in the (Q*P) resource units.

In one subembodiment, any two of the (L1+L2) resource units are non-overlapping.

In one affiliated embodiment of the above subembodiment, the third radio signal is transmitted behind the first radio signal, the third radio signal includes (Q*P) bits, the (Q*P) bits are one-to-one corresponding to (Q*P) resource units, the (Q*P) bits included in the third radio signal include (L1+L2) 1's, and the (L1+L2) 1's are used for indicating the (L1+L2) resource units occupied by the first radio signal and the second radio signal.

In one subembodiment, the third radio signal is used for indicating positions of the (L1+L2) different second-type bit subblocks in the K second-type bit subblocks.

In one affiliated embodiment of the above subembodiment, the third radio signal is transmitted behind the first radio signal, the third radio signal includes K bits, the K bits are one-to-one corresponding to K second-type bit subblocks, the K bits included in the third radio signal include (L1+L2) 1's, and the (L1+L2) 1's are used for indicating positions of the (L1+L2) different second-type bit subblocks generating the first radio signal and the second radio signal in the K second-type bit subblocks.

In one embodiment, the first frequency-domain resource pool in the disclosure includes Q subbands, the first radio signal includes L1 first radio sub-signal(s), and the L1 first radio sub-signal(s) is(are) transmitted in Q1 subband(s) among the Q subbands respectively; the second bit block includes K second-type bit subblocks, and the L1 first radio sub-signal(s) is(are) generated by L1 second-type bit subblock(s) among the K second-type bit subblocks respectively; a first target radio sub-signal and a second target radio sub-signal are two different first radio sub-signals among the L1 first radio sub-signal(s); the first target radio sub-signal is transmitted in a first target subband among the Q subbands, and the second target radio sub-signal is transmitted in a second target subband among the Q subbands; a position of a subcarrier occupied by the first target radio sub-signal in the first target subband is the same as a position of a subcarrier occupied by the second target radio sub-signal in the second target subband.

In one subembodiment, the position of a subcarrier occupied by the first target radio sub-signal in the first target subband is indicated through the first signaling.

In one embodiment, the first frequency-domain resource pool in the disclosure includes Q subbands, the second radio signal includes L2 second radio sub-signal(s), and the L2 second radio sub-signal(s) is(are) transmitted in Q2 subband(s) among the Q subbands respectively; the second bit block includes K second-type bit subblocks, and the L2 second radio sub-signal(s) is(are) generated by L2 second-type bit subblock(s) among the K second-type bit subblocks respectively; a third target radio sub-signal and a fourth target radio sub-signal are two different second radio sub-signals among the L2 second radio sub-signal(s); the third target radio sub-signal is transmitted in a third target subband among the Q subbands, and the fourth target radio sub-signal is transmitted in a fourth target subband among the Q subbands; a position of a subcarrier occupied by the third target radio sub-signal in the third target subband is the same as a position of a subcarrier occupied by the fourth target radio sub-signal in the fourth target subband.

In one subembodiment, the position of a subcarrier occupied by the third target radio sub-signal in the third target subband is indicated through the first signaling.

In one embodiment, the phrase that the radio signal in the disclosure occupies a positive integer number of subbands refers that: the radio signal occupies partial or all subcarriers included in any one of the positive integer number of subbands.

In one embodiment, the phrase that the radio signal in the disclosure occupies a positive integer number of resource unit refers that: the radio signal occupies partial or all Resource Elements (REs) included in any one of the positive integer number of resource units.

In one embodiment, the phrase that the radio sub-signal in the disclosure occupies one resource unit refers that: the radio sub-signal occupies partial or all REs included in the one resource unit.

Embodiment 6

Figure 6:
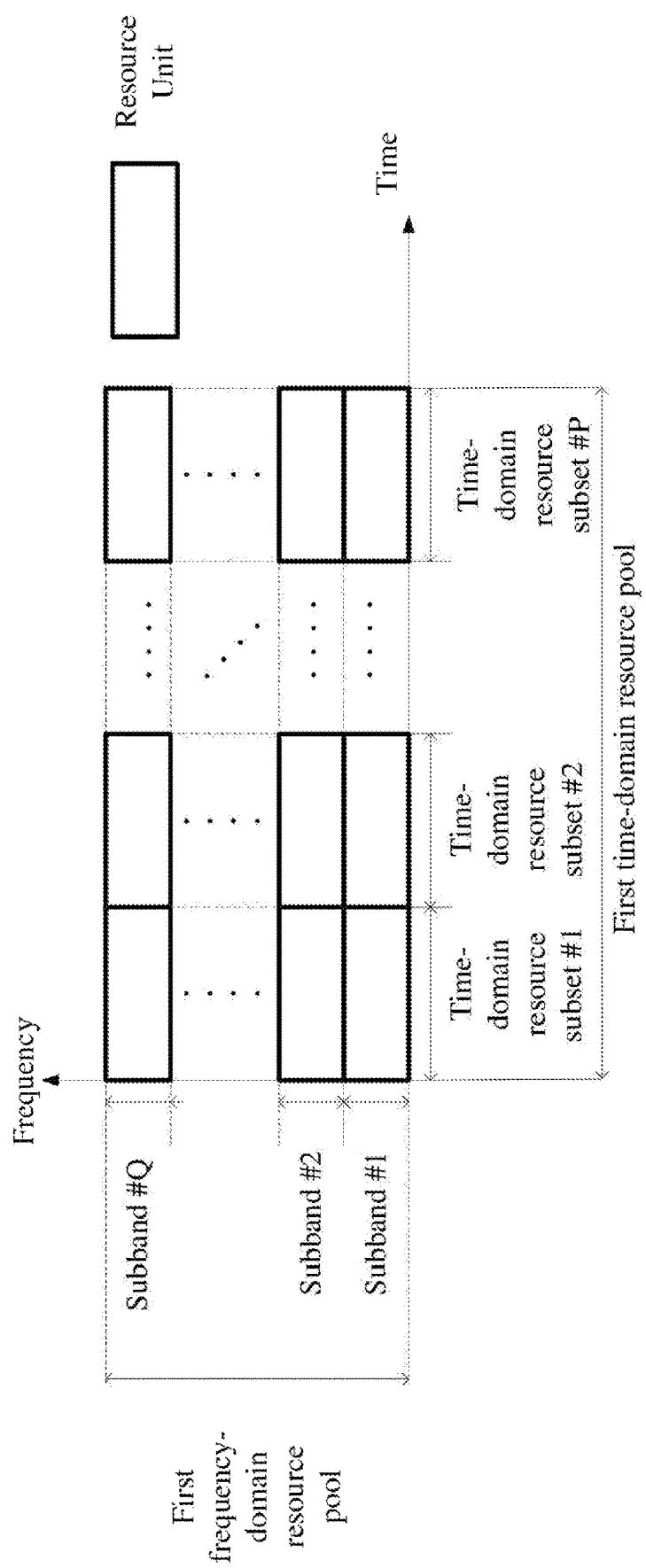
FIG. 6 is a diagram illustrating a first frequency-domain resource pool and a first time-domain resource pool according to one embodiment of the disclosure.

Embodiment 6 illustrates an example of a diagram of a first frequency-domain resource pool and a first time-domain resource pool, as shown in FIG. 6. In FIG. 6, the first frequency-domain resource pool includes Q subbands, which are a subband #1 to a subband #Q respectively; the first time-domain resource pool includes P time-domain resource subsets, which are a time-domain resource subset #1 to a time-domain resource subset #P respectively; in FIG. 6, an overlapping part of one subband and one time-domain resource subset forms one resource unit, and the time-frequency resources included in the first frequency-domain resource pool and the first time-domain resource pool include (Q*P) resource units; the Q and the P are both positive integers greater than 1.

In one embodiment, the first signaling in the disclosure is used for indicating the first frequency-domain resource pool and the first time-domain resource pool.

In one embodiment, the first signaling in the disclosure is used for determining a number of bits included in the first bit block in the disclosure, and the UE determines a number of resource units occupied by the first bit block among the (Q*P) resource units according to the number of bits included in the first bit block.

In one embodiment, any one of the (Q*P) resource units includes a positive integer number of REs.

In one embodiment, any two different resource units among the (Q*P) resource units include a same number of REs.

In one embodiment, the first radio signal occupies L1 resources units among the (Q*P) resource units, and patterns of REs occupied by the first radio signal in the L1 resource units are the same.

In one subembodiment, the first signaling is used for indicating patterns of the occupied REs in the L1 resource units.

In one embodiment, the second radio signal occupies L2 resources units among the (Q*P) resource units, and patterns of REs occupied by the second radio signal in the L2 resource units are the same.

In one subembodiment, the first signaling is used for indicating patterns of the occupied REs in the L2 resource units.

In one embodiment, the first radio signal occupies L1 resources units among the (Q*P) resource units, the second radio signal occupies L2 resources units among the (Q*P) resource units, patterns of REs occupied by the first radio signal in the L1 resource units are the same as patterns of REs occupied by the second radio signal in the L2 resource units are the same.

Embodiment 7

Figure 7:
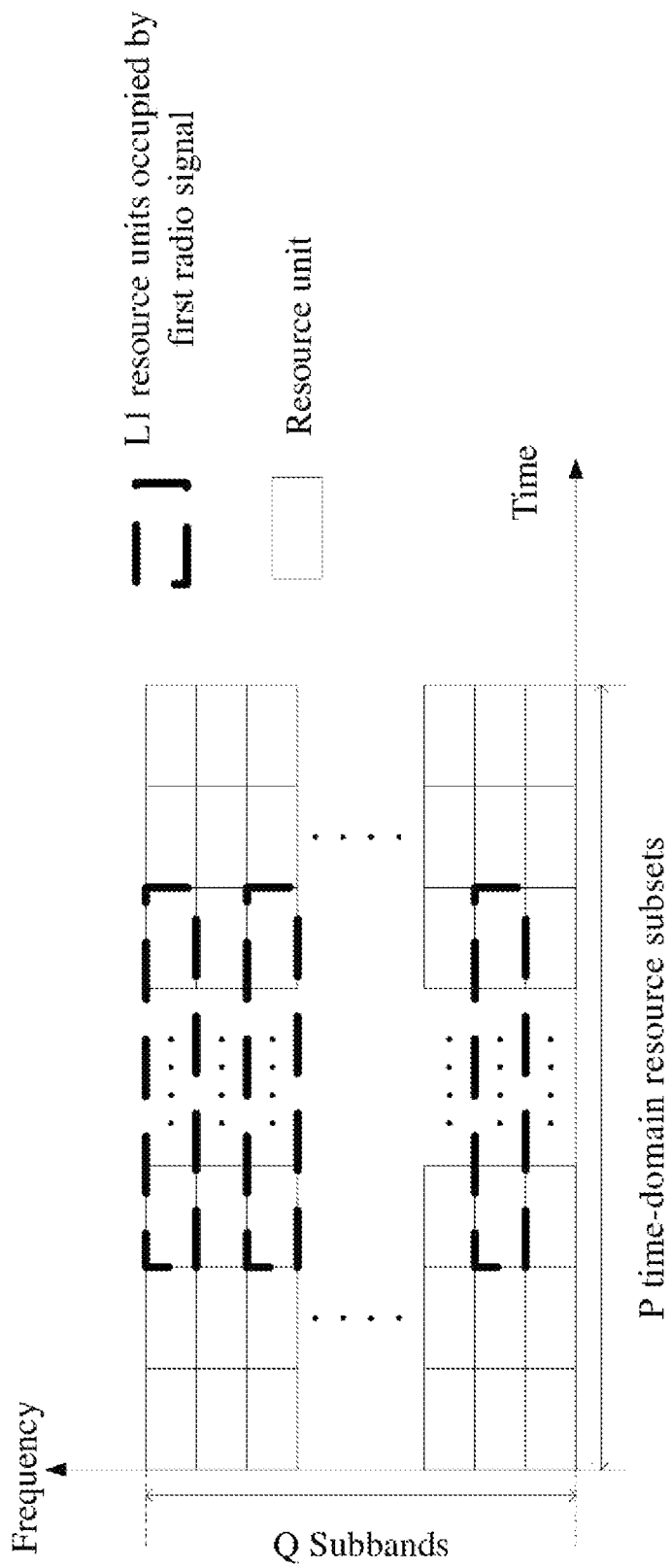
FIG. 7 is a diagram illustrating time-frequency resources occupied by a first radio signal according to one embodiment of the disclosure.

Embodiment 7 illustrates an example of a diagram of time-frequency resources occupied by one first radio signal, as shown in FIG. 7. In FIG. 7, the first radio signal occupies L1 resources units among the (Q*P) resource units shown in FIG. 7, and the L1 is a positive integer not greater than the (Q*P).

In one embodiment, the first radio signal occupies partial or all REs included in any one of the L1 resource units.

In one embodiment, the L1 resource units are located on Q1 subbands among the Q subbands, and the L1 resource units are located on P1 time-domain resource subsets among the P time-domain resource subsets; the Q1 is a positive integer not greater than the Q, and the P1 is a positive integer not greater than the P; any one of the Q1 subbands is occupied by the first radio signal in the P1 time-domain resource subsets, and the P1 time-domain resource subsets are consecutive.

In one subembodiment, the Q1 subbands include frequency-domain resources included in the first frequency-domain resource set in the disclosure.

In one subembodiment, the P1 time-domain resource subsets constitute the first time-domain resource set in the disclosure.

In one embodiment, the first frequency-domain resource set in the disclosure is all subcarriers occupied by the L1 resource units.

In one embodiment, the first time-domain resource set in the disclosure is all multicarrier symbols occupied by the L1 resource units.

In one embodiment, the first time-frequency resource set in the disclosure is all REs occupied by the L1 resource units.

Embodiment 8

Figure 8:
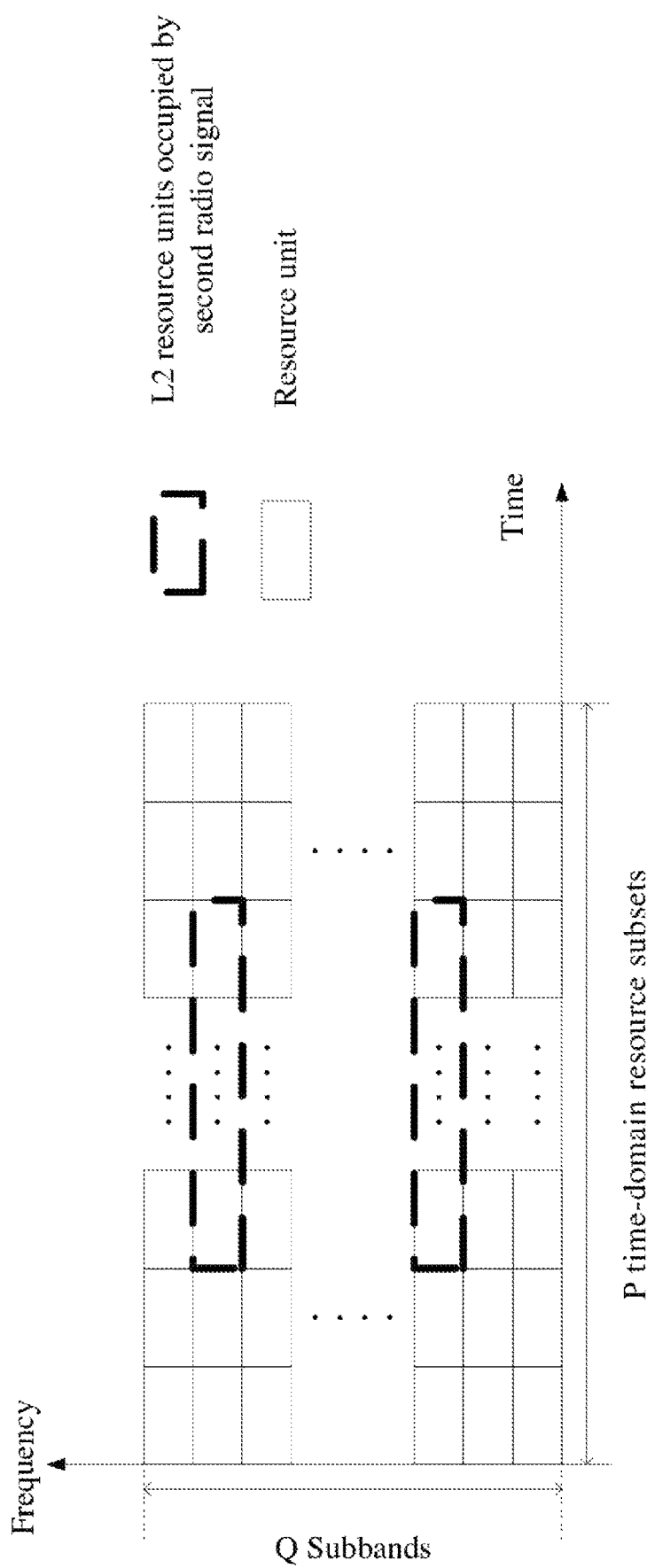
FIG. 8 is a diagram illustrating time-frequency resources occupied by a second radio signal according to one embodiment of the disclosure.

Embodiment 8 illustrates an example of a diagram of time-frequency resources occupied by one second radio signal, as shown in FIG. 8. In FIG. 8, the second radio signal occupies L2 resources units among the (Q*P) resource units shown in FIG. 8, and the L2 is a positive integer not greater than the (Q*P).

In one embodiment, the second radio signal occupies partial or all REs included in any one of the L2 resource units.

In one embodiment, the L2 resource units are located on Q2 subbands among the Q subbands, and the L2 resource units are located on P2 time-domain resource subsets among the P time-domain resource subsets; the Q2 is a positive integer not greater than the Q, and the P2 is a positive integer not greater than the P; any one of the Q2 subbands is occupied by the second radio signal in the P2 time-domain resource subsets, and the P2 time-domain resource subsets are consecutive.

In one subembodiment, the Q2 subbands include frequency-domain resources included in the second frequency-domain resource set in the disclosure.

In one subembodiment, the P2 time-domain resource subsets constitute the second time-domain resource set in the disclosure.

In one embodiment, the second frequency-domain resource set in the disclosure is all subcarriers occupied by the L2 resource units.

In one embodiment, the second time-domain resource set in the disclosure is all multicarrier symbols occupied by the L2 resource units.

In one embodiment, the second time-frequency resource set in the disclosure is all REs occupied by the L2 resource units.

Embodiment 9

Figure 9:
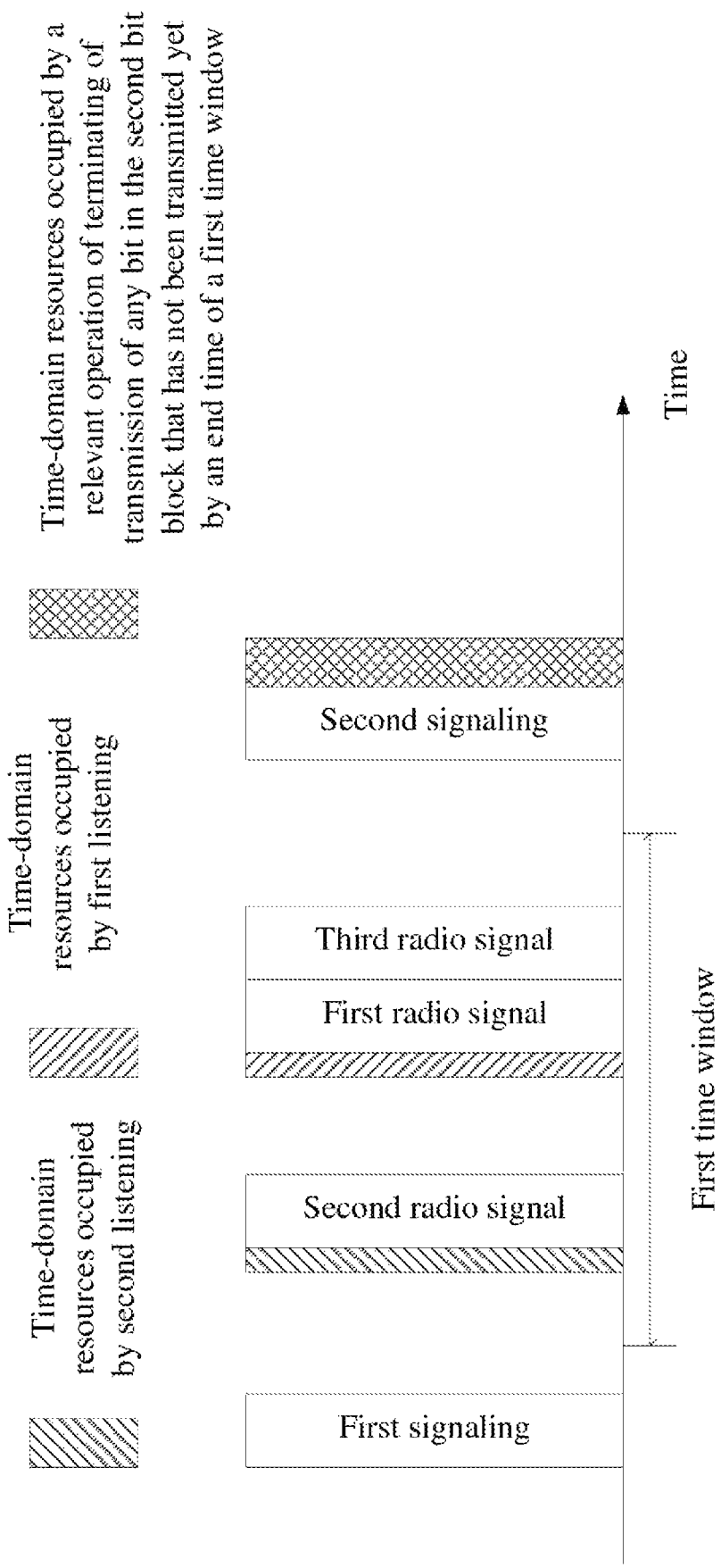
FIG. 9 is a diagram illustrating a timing relationship according to one embodiment of the disclosure.

Embodiment 9 illustrates an example of a diagram of a timing relationship, as shown in FIG. 9. In FIG. 9, the first signaling, the first listening, the first radio signal, the second listening, the second radio signal, the third radio signal, the second signaling and the relevant operation of terminating of transmission of any bit in the second bit block that has not been transmitted yet by an end time of a first time window in the disclosure are executed according to the sequence shown in FIG. 9.

In one embodiment, a duration between a start time of the second radio signal and an end time of the first radio signal is greater than one MCOT of the UE.

In one embodiment, the UE includes one RF only, and the one RF performs the first listening on the Q subbands in the disclosure simultaneously.

In one embodiment, the UE includes multiple RFs, and the multiple RFs perform the first listening on the Q subbands in the disclosure simultaneously.

In one embodiment, the UE includes one RF only, and the one RF performs the second listening on the Q subbands in the disclosure simultaneously.

In one embodiment, the UE includes multiple RFs, and the multiple RFs perform the second listening on the Q subbands in the disclosure simultaneously.

Embodiment 10

Figure 10:
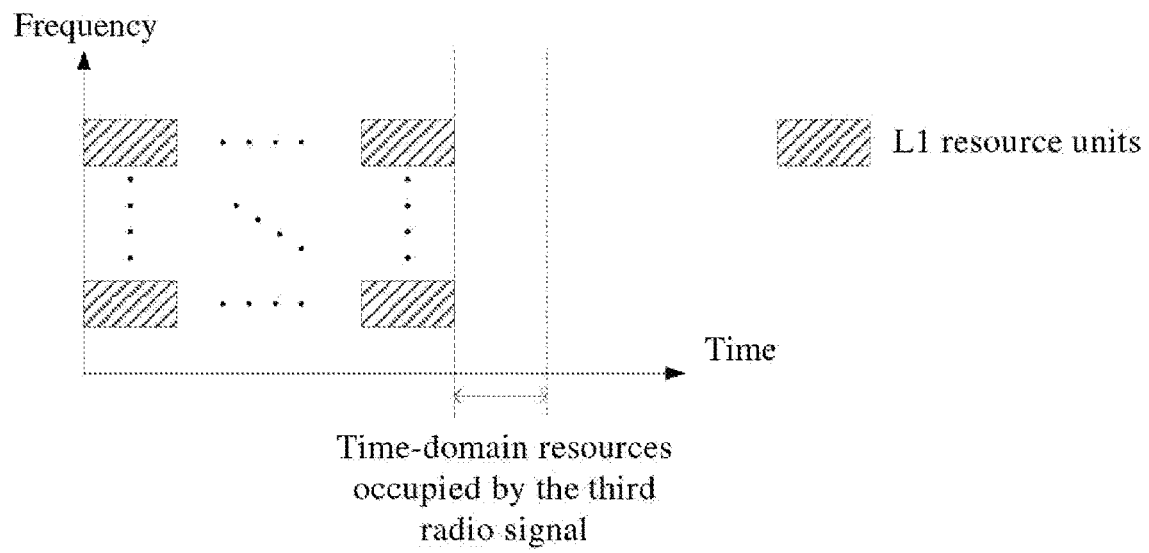
FIG. 10 is a diagram illustrating a third radio signal according to one embodiment of the disclosure.

Embodiment 10 illustrates an example of a diagram of one third radio signal, as shown in FIG. 10. In FIG. 10, the first radio signal includes L1 first radio sub-signals, the L1 first radio sub-signals are transmitted in L1 resource units among the (Q*P) resource units illustrated in Embodiment 6 respectively, and time-domain resources occupied by the third radio signal are located behind the L1 resource units.

In one embodiment, the third radio signal includes a first field, the first field includes (Q*P) bits, and the (Q*P) bits are used for indicating whether the (Q*P) resource units are occupied by the first radio signal respectively.

In one embodiment, the third radio signal includes a first field, the first field includes (Q*P) bits, and the (Q*P) bits are used for indicating whether the (Q*P) resource units are occupied by the first radio signal and the second radio signal in the disclosure respectively.

In one embodiment, the second bit block includes K second-type bit subblocks, L1 second-type bit subblocks among the K second-type bit subblocks are used for generating the first radio signal, the third radio signal includes a second field, the second field includes K bits, and the K bits are used for indicating positions of the L1 second-type bit subblocks in the K second-type bit subblocks; the K is a positive integer, and the L1 is a positive integer not greater than the K.

In one embodiment, the second bit block includes K second-type bit subblocks, L1 second-type bit subblocks among the K second-type bit subblocks are used for generating the first radio signal, and L2 second-type bit subblocks among the K second-type bit subblocks are used for generating the second radio signal; the third radio signal includes a second field, the second field includes K bits, and the K bits are used for indicating positions of the L1 second-type bit subblocks and the L2 second-type bit subblocks in the K second-type bit subblocks; the K is a positive integer, the L1 is a positive integer, the L2 is a positive integer, and the summation of the L1 and the L2 is not greater than the K.

Embodiment 11

Figure 11:
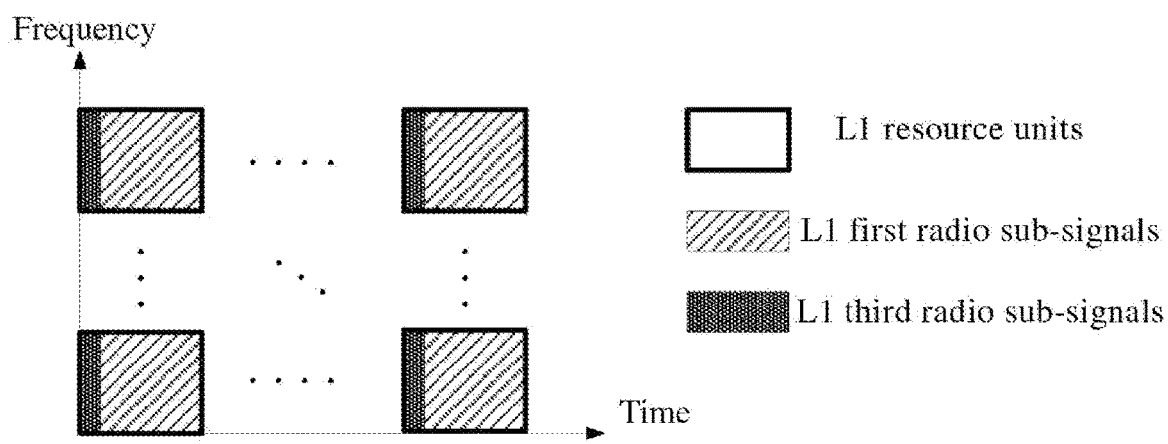
FIG. 11 is another diagram illustrating a third radio signal according to one embodiment of the disclosure.

Embodiment 11 illustrates an example of another diagram of one third radio signal, as shown in FIG. 11. In FIG. 11, the first radio signal includes L1 first radio sub-signals, the L1 first radio sub-signals are transmitted in L1 resource units among the (Q*P) resource units illustrated in Embodiment 6 respectively, the third radio signal includes L1 third radio sub-signals, and the L1 third radio sub-signals are associated with the L1 first radio sub-signals respectively; the second bit block includes K second-type bit subblocks, L1 second-type bit subblocks among the K second-type bit subblocks are used for generating the first radio signal.

In one embodiment, the L1 third radio sub-signals are transmitted in the same resource units as the L1 first radio sub-signals respectively.

In one embodiment, a given third radio sub-signal is any one of the L1 third radio sub-signals, and the given third radio sub-signal is associated with a given first radio sub-signal among the L1 first radio sub-signals; the given third radio sub-signal is used for indicating a position of a resource unit occupied by the given first radio sub-signal in the (Q*P) resource units.

In one subembodiment, the given third radio sub-signal includes a third field, the third field includes $\log_2\lceil Q*P \rceil$ bits, the $\log_2\lceil Q*P \rceil$ bits are used for indicating which one of the (Q*P) resource units is occupied by the given first radio sub-signal respectively, wherein $\lceil Q*P \rceil$ represents a minimum integer not less than (Q*P).

In one embodiment, a given third radio sub-signal is any one of the L1 third radio sub-signals, and the given third radio sub-signal is associated with a given first radio sub-signal among the L1 first radio sub-signals; the given third radio sub-signal is used for indicating a position of a second-type bit subblock occupied by the given first radio sub-signal in the K second-type bit subblocks.

In one subembodiment, the given third radio sub-signal includes a fourth field, the third field includes $\log_2\lceil K \rceil$ bits, the $\log_2\lceil K \rceil$ are used for indicating which one of the K second-type bit subblocks is used for generating the given first radio sub-signal respectively, wherein $\lceil K \rceil$ represents a minimum integer not less than K.

In one embodiment, the L1 first radio sub-signals occupy in time domain P1 time-domain resource subsets among the P time-domain resource subsets illustrated in Embodiment 6; a third radio sub-signal located in one given time-domain resource subset among the P1 time-domain resource subsets includes a same first bit set.

In one subembodiment, the first bit set includes Q bits, and the Q bits are used for indicating frequency-domain positions of resource units occupied by the first radio signal in the given time-domain resource subset respectively.

In one subembodiment, the first bit set includes K bits, and the K bits are used for indicating second-type bit subblocks among the K second-type bit subblocks that are used for generating the L1 first radio sub-signals in the given time-domain resource subset respectively.

Embodiment 12

Figure 12:
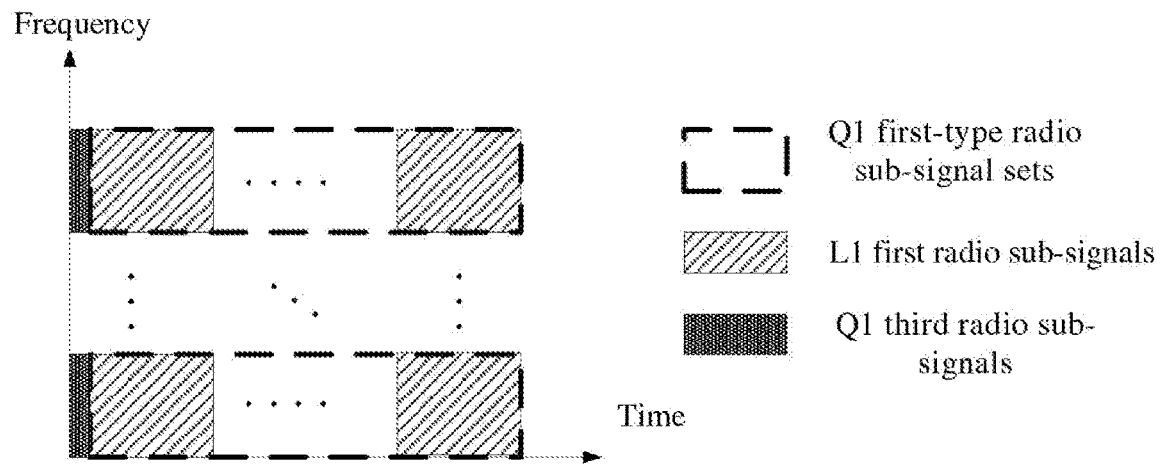
FIG. 12 is yet another diagram illustrating a third radio signal according to one embodiment of the disclosure.

Embodiment 12 illustrates an example of yet another diagram of one third radio signal, as shown in FIG. 12. In FIG. 12, the first radio signal includes L1 first radio sub-signals, the L1 first radio sub-signals are transmitted in L1 resource units among the (Q*P) resource units illustrated in Embodiment 6 respectively, and the L1 resource units occupy in frequency domain Q1 subbands among the Q subbands illustrated in Embodiment 6; the first radio signal includes Q1 first-type radio sub-signal sets, any one of the L1 first radio sub-signals belongs to one of the Q1 first-type radio sub-signal sets only, any one of the Q1 first-type radio sub-signal sets consists of a positive integer number of first radio sub-signals among the L1 first radio sub-signals, the Q1 is less than the L1, and the Q1 first-type radio sub-signal sets are transmitted in Q1 subbands among the Q subbands respectively; the third radio signal includes Q1 third radio sub-signals, the Q1 third radio sub-signals are associated with the Q1 subbands respectively, and the Q1 third radio sub-signals are associated with the Q1 first-type radio sub-signal sets respectively; the second bit block includes K second-type bit subblocks, and L1 second-type bit subblocks among the K second-type bit subblocks are used for generating the first radio signal.

In one embodiment, the Q1 third radio sub-signals are transmitted in the Q1 subbands respectively.

In one embodiment, the Q1 third radio sub-signals are all transmitted in an earliest time-domain resource subset occupied by the first radio signal.

In one embodiment, a given third radio sub-signal is any one of the Q1 third radio sub-signals, the given third radio sub-signal is associated with a given first-type radio sub-signal set among the Q1 first-type radio sub-signal sets, and the given first-type radio sub-signal set is transmitted in a given subband among the Q1 subbands.

In one subembodiment, the given third radio sub-signal includes a fifth field, the fifth field includes P bits, the P bits are one-to-one corresponding to P resource units in the given subband that belong to the first time-domain resource pool respectively, and the P bits are used for indicating resource units among the P resource units that are occupied by the first-type radio sub-signal set.

In one subembodiment, the given third radio sub-signal includes a sixth field, the sixth field includes K bits, the K bits are one-to-one corresponding to K second-type bit subblocks, and the K bits are used for indicating second-type bit subblocks among the K second-type bit subblocks that are used for generating the given first-type radio sub-signal set.

Embodiment 13

Figure 13:
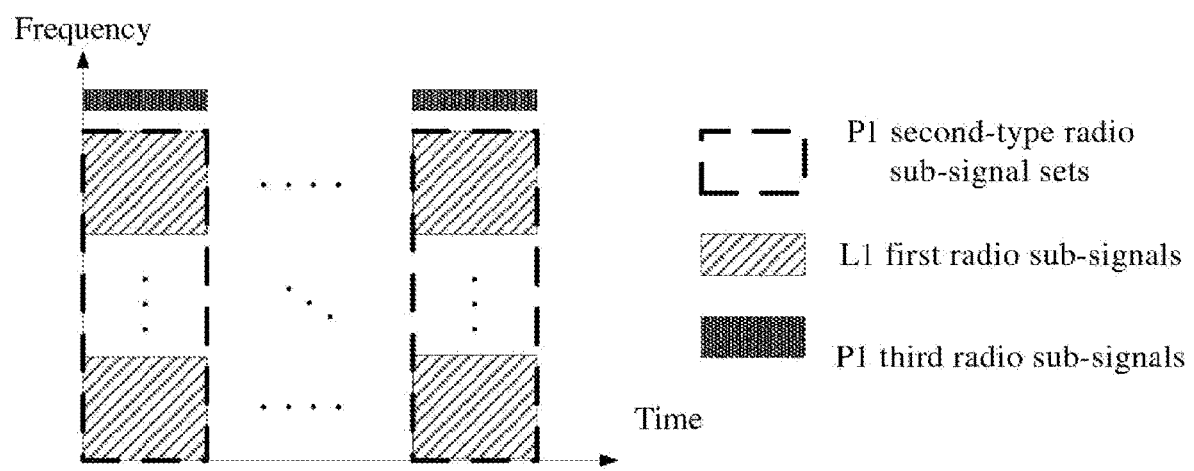
FIG. 13 is still yet another diagram illustrating a third radio signal according to one embodiment of the disclosure.

Embodiment 13 illustrates an example of still yet another diagram of one third radio signal, as shown in FIG. 13. In FIG. 13, the first radio signal includes L1 first radio sub-signals, the L1 first radio sub-signals are transmitted in L1 resource units among the (Q*P) resource units illustrated in Embodiment 6 respectively, and the L1 resource units occupy in time domain P1 time-domain resource subsets among the P time-domain resource subsets illustrated in Embodiment 6; the first radio signal includes P1 second-type radio sub-signal sets, any one of the L1 first radio sub-signals belongs to one of the P1 second-type radio sub-signal sets only, any one of the P1 second-type radio sub-signal sets consists of a positive integer number of first radio sub-signals among the L1 first radio sub-signals, the P1 is less than the L1, and the P1 second-type radio sub-signal sets are transmitted in P1 time-domain resource subsets respectively; the third radio signal includes P1 third radio sub-signals, the P1 third radio sub-signals are associated with the P1 time-domain resource subsets respectively, and the P1 third radio sub-signals are associated with the P1 second-type radio sub-signal sets respectively; the second bit block includes K second-type bit subblocks, and L1 second-type bit subblocks among the K second-type bit subblocks are used for generating the first radio signal.

In one embodiment, the P1 third radio sub-signals are transmitted in P1 time-domain resource subsets respectively.

In one embodiment, any one of the P1 third radio sub-signals is transmitted on licensed spectrum.

In one embodiment, the P1 third radio sub-signals are all transmitted in one candidate subband among subbands occupied by the first radio signal.

In one subembodiment, the candidate subband is one subband having a lowest center frequency among the subbands occupied by the first radio signal.

In one subembodiment, the candidate subband is one subband having a highest center frequency among the subbands occupied by the first radio signal.

In one embodiment, a given third radio sub-signal is any one of the P1 third radio sub-signals, the given third radio sub-signal is associated with a given second-type radio sub-signal set among the P1 second-type radio sub-signal sets, and the given second-type radio sub-signal set occupies a given time-domain resource subset among the P1 time-domain resource subsets.

In one subembodiment, the given third radio sub-signal includes a seventh field, the seventh field includes Q bits, the Q bits are one-to-one corresponding to Q resource units in the given time-domain resource subset respectively, and the Q bits are used for indicating resource units occupied by the given second-type radio sub-signal set.

In one subembodiment, the given third radio sub-signal includes an eighth field, the eighth field includes K bits, the K bits are one-to-one corresponding to K second-type bit subblocks, and the K bits are used for indicating second-type bit subblocks among the K second-type bit subblocks that are used for generating the given second-type radio sub-signal set.

Embodiment 14

Figure 14:
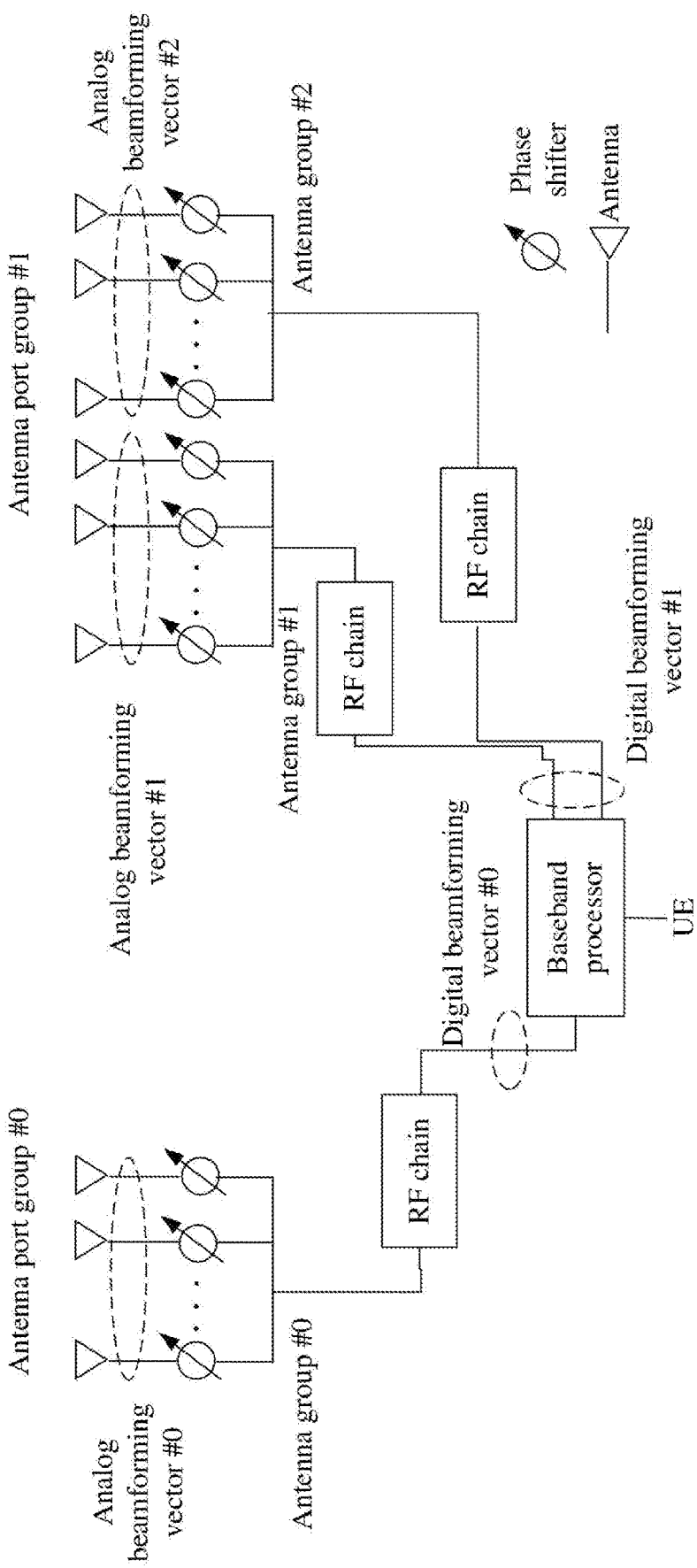
FIG. 14 is a diagram illustrating an antenna port and an antenna port group according to one embodiment of the disclosure.

Embodiment 14 illustrates an example of a diagram of an antenna port and an antenna port group, as shown in FIG. 14.

In Embodiment 14, one antenna port group includes a positive integer number of antenna ports; one antenna port is formed by antennas in a positive integer number of antenna groups through antenna virtualization superposition; one antenna group includes a positive integer number of antennas. One antenna group is connected to a baseband processor through one Radio Frequency (RF) chain, and different antenna groups correspond to different RF chains. Mapping coefficients from all antennas in a positive integer number of antenna groups included in a given antenna port to the given antenna port constitute a beamforming vector corresponding to the given antenna port. Mapping coefficients from multiple antennas included in any one given antenna group among a positive integer number of antenna groups included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 14 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively.

Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna port. For example, the antenna port group #0 illustrated in FIG. 14 includes one antenna port.

In one subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the analog beamforming vector of the one antenna port. For example, the digital beamforming vector #0 in FIG. 14 is dimensionally reduced to one scalar, and the beamforming vector corresponding to the antenna port in the antenna port group #0 is the analog beamforming vector #0.

In one embodiment, one antenna port group includes multiple antenna ports. For example, the antenna port group #1 includes multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in one antenna port group are QCLed.

In one subembodiment, the phrase that two antenna ports are QCLed includes: partial or all large-scale properties of a radio signal transmitted by one of the two antenna ports can be deduced from partial or all large-scale properties of a radio signal transmitted by the other of the two antenna ports; the large-scale properties include one or more of delay spread, Doppler spread, Doppler shift, path loss and average gain.

In one embodiment, any two antenna ports in one antenna port group are spatial QCLed.

In one embodiment, one RF chain shown in FIG. 14 is used for performing the first listening on one of the Q subbands in the disclosure.

In one embodiment, one RF chain shown in FIG. 14 is used for performing the first listening on multiple subbands among the Q subbands in the disclosure.

In one embodiment, one RF chain shown in FIG. 14 is used for performing the second listening on multiple subbands among the Q subbands in the disclosure.

Embodiment 15

Figure 15:
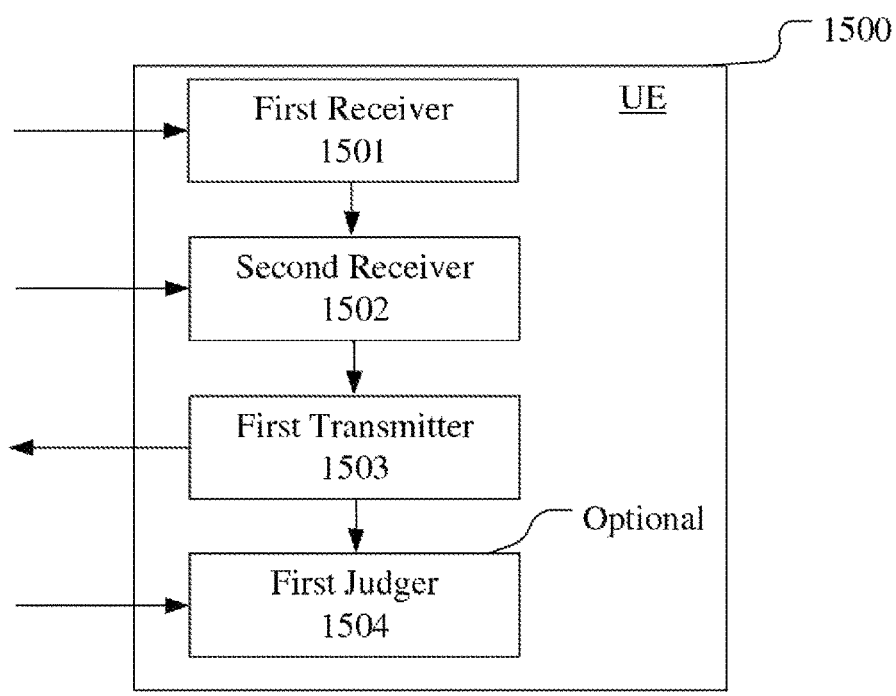
FIG. 15 is a structure block diagram illustrating a processing device in a UE according to one embodiment of the disclosure.

Embodiment 15 illustrates an example of a structure block diagram of a processing device in a UE, as shown in FIG. 15. In FIG. 15, the processing device 1500 in the UE is mainly composed of a first receiver 1501, a second receiver 1502, a first transmitter 1503 and a first judger 1504.

The first receiver 1501 receives a first signaling, the first signaling being used for determining a number of bits included in a first bit block.

The second receiver 1502 performs first listening to determine that a first frequency-domain resource set is available for wireless transmission.

The first transmitter 1503 transmits a first radio signal in a first time-domain resource set of the first frequency-domain resource set.

The first judger 1504 terminates transmission of any bit in the second bit block that has not been transmitted yet by an end time of a first time window.

In Embodiment 15, a second bit block is used for generating the first radio signal, and the second bit block is obtained after the first bit block is processed through channel coding; the first time-domain resource set is related to a number of bits not transmitted in a current second bit block and the first frequency-domain resource set; and the first signaling indicates the first time window, and the first time window includes the first time-domain resource set.

In one subembodiment, the second receiver 1502 further performs second listening to determine that a second frequency-domain resource set is available for wireless transmission, and the first transmitter 1503 further transmits a second radio signal in a second time-domain resource set of the second frequency-domain resource set; the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

In one embodiment, the first judger further receives a second signaling, the second signaling being used for indicating whether the first bit block is correctly received; the second signaling is transmitted behind the first time window, and the UE does not transmit any bit in the second bit block between the end time of the first time window and a transmit start time of the second signaling.

In one embodiment, the first transmitter 1503 further transmits a third radio signal; and the third radio signal indicates at least one of the first frequency-domain resource set and the first time-domain resource set.

In one subembodiment, the first receiver 1501 includes at least the former four of the antenna 452, the receiver 454, the multi-antenna receiving processor 458, the receiving processor 456 and the controller/processor 459 illustrated in Embodiment 4.

In one subembodiment, the second receiver 1502 includes at least the former four of the antenna 452, the receiver 454, the multi-antenna receiving processor 458, the receiving processor 456 and the controller/processor 459 illustrated in Embodiment 4.

In one embodiment, the first transmitter 1503 includes at least the former four of the antenna 452, the transmitter 454, the multi-antenna transmitting processor 457, the transmitting processor 468 and the controller/processor 459 illustrated in Embodiment 4.

In one embodiment, the first judger 1504 includes at least the former four of the antenna 452, the receiver 454, the multi-antenna receiving processor 458, the receiving processor 456 and the controller/processor 459 illustrated in Embodiment 4.

Embodiment 16

Figure 16:
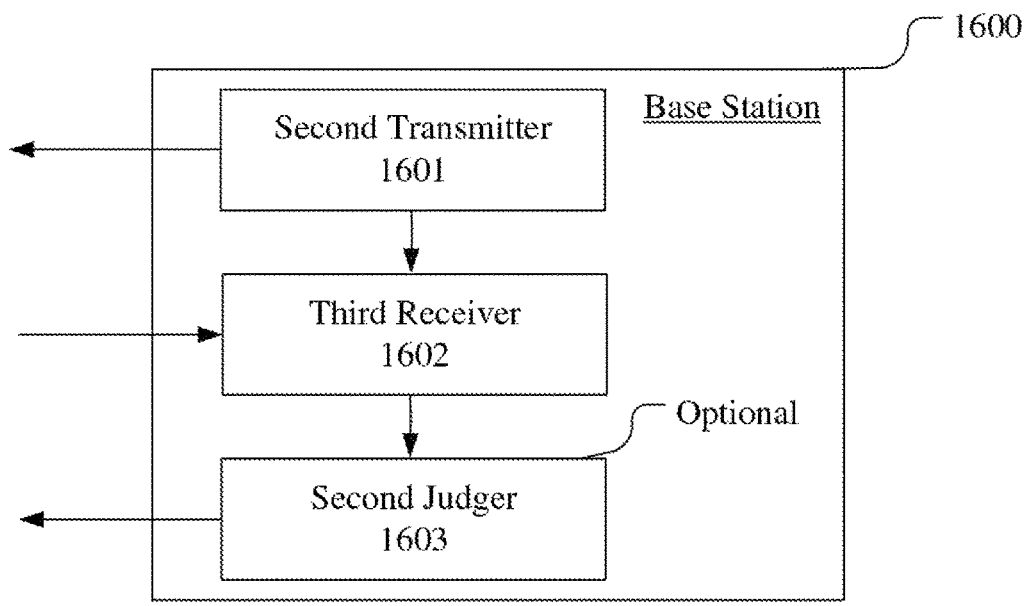
FIG. 16 is a structure block diagram illustrating a processing device in a base station according to one embodiment of the disclosure.

Embodiment 16 illustrates an example of a structure block diagram of a processing device in a base station, as shown in FIG. 16. In FIG. 16, the processing device 1600 in the base station is mainly composed of a second transmitter 1601, a third receiver 1602 and a second judger 1603, wherein the second judger 1603 is optional.

The second transmitter 1601 transmits a first signaling, the first signaling being used for determining a number of bits included in a first bit block.

The third receiver 1602 receives a first radio signal in a first time-domain resource set of a first frequency-domain resource set.

The second judger 1603 terminates reception of any bit in the second bit block that has not been received yet by an end time of a first time window.

In Embodiment 16, a second bit block is used for generating the first radio signal, and the second bit block is obtained after the first bit block is processed through channel coding; the first time-domain resource set is related to a number of bits not transmitted in a current second bit block and the first frequency-domain resource set; and the first signaling indicates the first time window, and the first time window includes the first time-domain resource set.

In one embodiment, the third receiver 1602 further receives a second radio signal in a second time-domain resource set of a second frequency-domain resource set; the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

In one embodiment, the third receiver 1602 further receives a third radio signal; and the third radio signal indicates at least one of the first frequency-domain resource set and the first time-domain resource set.

In one embodiment, the second judger 1603 further transmits a second signaling, the second signaling being used for indicating whether the first bit block is correctly received; Herein, the second signaling is transmitted behind the first time window, and the base station does not receive any bit in the second bit block between the end time of the first time window and a time to start transmitting the second signaling.

In one embodiment, the second transmitter 1601 includes at least the former four of the antenna 420, the transmitter 418, the multi-antenna transmitting processor 471, the transmitting processor 416 and the controller/processor 475 illustrated in Embodiment 4.

In one embodiment, the third receiver 1602 includes at least the former four of the antenna 420, the receiver 418, the multi-antenna receiving processor 472, the receiving processor 470 and the controller/processor 475 illustrated in Embodiment 4.

In one embodiment, the second judger 1603 includes at least the former four of the antenna 420, the transmitter 418, the multi-antenna transmitting processor 471, the transmitting processor 416 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, gNB (NR Node B), TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
 receiving a first signaling, the first signaling being used for determining a number of bits comprised in a first bit block;
 performing first listening to determine that a first frequency-domain resource set is available for wireless transmission; and
 transmitting a first radio signal in a first time-domain resource set of the first frequency-domain resource set;
 wherein a second bit block is used for generating the first radio signal, and the second bit block is obtained after the first bit block is processed through channel coding; and the first time-domain resource set is related to a number of bits not transmitted in a current second bit block and the first frequency-domain resource set.

2. The method according to claim 1, comprising:
performing second listening to determine that a second frequency-domain resource set is available for wireless transmission; and
transmitting a second radio signal in a second time-domain resource set of the second frequency-domain resource set;
wherein the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

3. The method according to claim 1, comprising:
terminating transmission of any bit in the second bit block that has not been transmitted yet by an end time of a first time window;
wherein the first signaling indicates the first time window, and the first time window comprises the first time-domain resource set.

4. The method according to claim 1, comprising:
transmitting a third radio signal;
wherein the third radio signal indicates at least one of the first frequency-domain resource set and the first time-domain resource set.

5. The method according to claim 2, comprising:
transmitting a third radio signal;
wherein the third radio signal indicates at least one of the first frequency-domain resource set and the first time-domain resource set.

6. A method in a base station for wireless communication, comprising:
transmitting a first signaling, the first signaling being used for determining a number of bits comprised in a first bit block; and
receiving a first radio signal in a first time-domain resource set of a first frequency-domain resource set;
wherein a second bit block is used for generating the first radio signal, and the second bit block is obtained after the first bit block is processed through channel coding; and the first time-domain resource set is related to a number of bits not transmitted in a current second bit block and the first frequency-domain resource set.

7. The method according to claim 6, comprising:
receiving a second radio signal in a second time-domain resource set of a second frequency-domain resource set;
wherein the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

8. The method according to claim 6, comprising:
terminating reception of any bit in the second bit block that has not been transmitted yet by an end time of a first time window;
wherein the first signaling indicates the first time window, and the first time window comprises the first time-domain resource set.

9. The method according to claim 6, comprising:
receiving a third radio signal;
wherein the third radio signal indicates at least one of the first frequency-domain resource set and the first time-domain resource set.

10. The method according to claim 7, comprising:
receiving a third radio signal;
wherein the third radio signal indicates at least one of the first frequency-domain resource set and the first time-domain resource set.

11. A UE for wireless communication, comprising:
a first receiver, to receive a first signaling, the first signaling being used for determining a number of bits comprised in a first bit block;
a second receiver, to perform first listening to determine that a first frequency-domain resource set is available for wireless transmission; and
a first transmitter, to transmit a first radio signal in a first time-domain resource set of the first frequency-domain resource set;
wherein a second bit block is used for generating the first radio signal, and the second bit block is obtained after the first bit block is processed through channel coding; and the first time-domain resource set is related to a number of bits not transmitted in a current second bit block and the first frequency-domain resource set.

12. The UE according to claim 11, wherein the second receiver further performs second listening to determine that a second frequency-domain resource set is available for wireless transmission, and the first transmitter further transmits a second radio signal in a second time-domain resource set of the second frequency-domain resource set; the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

13. The UE according to claim 11, comprising:
a first judger, to terminate transmission of any bit in the second bit block that has not been transmitted yet by an end time of a first time window;
wherein the first signaling indicates the first time window, and the first time window comprises the first time-domain resource set.

14. The method according to claim 11, wherein the first transmitter further transmits a third radio signal; and the third radio signal indicates at least one of the first frequency-domain resource set and the first time-domain resource set.

15. The method according to claim 12, wherein the first transmitter further transmits a third radio signal; and the third radio signal indicates at least one of the first frequency-domain resource set and the first time-domain resource set.

16. A base station for wireless communication, comprising:
   a second transmitter, to transmit a first signaling, the first signaling being used for determining a number of bits comprised in a first bit block; and
   a third receiver, to receive a first radio signal in a first time-domain resource set of a first frequency-domain resource set;
   wherein a second bit block is used for generating the first radio signal, and the second bit block is obtained after the first bit block is processed through channel coding; and the first time-domain resource set is related to a number of bits not transmitted in a current second bit block and the first frequency-domain resource set.

17. The base station according to claim 16, wherein the third receiver further receives a second radio signal in a second time-domain resource set of a second frequency-domain resource set; the second time-domain resource set is before the first time-domain resource set, and a modulation symbol sequence obtained after modulation of the second bit block is mapped to a second time-frequency resource set and a first time-frequency resource set successively; the second time-frequency resource set occupies the second frequency-domain resource set and the second time-domain resource set in frequency domain and time domain respectively, and the first time-frequency resource set occupies the first frequency-domain resource set and the first time-domain resource set in frequency domain and time domain respectively.

18. The base station according to claim 16, comprising:
   a second judger, to terminate reception of any bit in the second bit block that has not been received yet by an end time of a first time window;
   wherein the first signaling indicates the first time window, and the first time window comprises the first time-domain resource set.

19. The base station according to claim 16, wherein the third receiver receives a third radio signal; and the third radio signal indicates at least one of the first frequency-domain resource set and the first time-domain resource set.

20. The base station according to claim 17, wherein the third receiver receives a third radio signal; and the third radio signal indicates at least one of the first frequency-domain resource set and the first time-domain resource set.

* * * * *